(12) United States Patent
Morino

(10) Patent No.: US 10,494,198 B2
(45) Date of Patent: Dec. 3, 2019

(54) PICKUP METHOD AND PICKUP DEVICE

(71) Applicant: TOYO JIDOKI CO., LTD., Tokyo (JP)

(72) Inventor: Manabu Morino, Yamaguchi-ken (JP)

(73) Assignee: TOYO JIDOKI CO., LTD., Tokyo (JP)

( * ) Notice: Subject to any disclaimer, the term of this patent is extended or adjusted under 35 U.S.C. 154(b) by 0 days.

(21) Appl. No.: 16/043,816

(22) Filed: Jul. 24, 2018

(65) Prior Publication Data
US 2019/0031451 A1  Jan. 31, 2019

(30) Foreign Application Priority Data
Jul. 25, 2017  (JP) ................. 2017-143962

(51) Int. Cl.
*B65G 47/90* (2006.01)
*B65G 59/04* (2006.01)
(Continued)

(52) U.S. Cl.
CPC ............ *B65G 47/902* (2013.01); *B65B 43/12* (2013.01); *B65G 43/08* (2013.01); *B65G 47/905* (2013.01); *B65G 47/914* (2013.01); *B65G 59/04* (2013.01); *B65H 3/0816* (2013.01); *B65H 3/0883* (2013.01); *B65H 3/46* (2013.01); *B65H 5/10* (2013.01); *B65H 7/02* (2013.01); *G06T 7/0004* (2013.01); *G06T 7/70* (2017.01); *B65H 2301/51212* (2013.01); *B65H 2511/20* (2013.01); *B65H 2513/41* (2013.01);
(Continued)

(58) Field of Classification Search
CPC ........ B65G 59/00; B65G 59/04; B65G 43/08; B65G 43/10; B65H 2220/01; B65H 2220/02; B65H 2220/11

USPC .......... 198/444, 401, 572; 414/796.4, 796.5, 414/797, 797.3
See application file for complete search history.

(56) References Cited

U.S. PATENT DOCUMENTS

| | | | | |
|---|---|---|---|---|
| 3,826,485 A * | 7/1974 | Shindo | ................. | B65H 3/0816 271/106 |
| 4,714,394 A * | 12/1987 | Ehlscheid | .............. | B65H 31/24 198/444 |
| 5,657,618 A * | 8/1997 | Dall'Omo | .............. | B65H 3/322 414/796 |
| 5,899,341 A * | 5/1999 | Irita | ..................... | B65G 47/918 209/571 |

(Continued)

FOREIGN PATENT DOCUMENTS

| JP | 2000-103411 A | 4/2000 |
|---|---|---|
| JP | 2000-327153 A | 11/2000 |

(Continued)

*Primary Examiner* — James R Bidwell
(74) *Attorney, Agent, or Firm* — Pillsbury Winthrop Shaw Pittman, LLP

(57) ABSTRACT

A pickup method and a pickup device which enable to properly lift an individual target bag body among a plurality of conveyed bag bodies are provided. A pickup device includes: a transfer device that holds a target bag body among a plurality of bag bodies by a conveying device while the plurality of bag bodies are conveyed, and lifts a whole of the target bag body after lifting a part of the target bag body; and a pickup control unit that obtains position suggestion data indicating a position of the target bag body, and controls the transfer device on a basis of the position suggestion data, wherein the pickup control unit moves the transfer device according to the position suggestion data, and makes the transfer device liftably hold the target bag body.

21 Claims, 13 Drawing Sheets

(51) Int. Cl.

| | |
|---|---|
| *B65G 43/08* | (2006.01) |
| *B65H 3/46* | (2006.01) |
| *B65H 7/02* | (2006.01) |
| *B65H 3/08* | (2006.01) |
| *B65H 5/10* | (2006.01) |
| *G06T 7/70* | (2017.01) |
| *B65B 43/12* | (2006.01) |
| *B65G 47/91* | (2006.01) |
| *G06T 7/00* | (2017.01) |

(52) U.S. Cl.
CPC ...... *B65H 2513/42* (2013.01); *B65H 2553/42* (2013.01); *G06T 2207/30112* (2013.01)

(56) References Cited

U.S. PATENT DOCUMENTS

| | | | |
|---|---|---|---|
| 6,422,801 B1* | 7/2002 | Solomon | B65H 3/0833 271/9.07 |
| 6,468,025 B1* | 10/2002 | Stumpf | B21D 43/24 271/18.1 |
| 7,581,370 B2* | 9/2009 | Koga | B65B 43/123 198/401 |
| 2005/0135918 A1* | 6/2005 | Tominaga | B65H 3/0816 414/795.7 |

FOREIGN PATENT DOCUMENTS

| | | |
|---|---|---|
| JP | 2001-253411 A | 9/2001 |
| JP | 2016-039262 A | 3/2016 |

* cited by examiner

PICKUP METHOD AND PICKUP DEVICE

CROSS-REFERENCE TO RELATED APPLICATIONS

This application is based upon and claims the benefit of priority from Japanese Patent Application No. 2017443962, filed on Jul. 25, 2017; the entire contents of which are incorporated herein by reference.

TECHNICAL FIELD

The present invention relates to a pickup method and a pickup device that can hold and lift a target bag body among a plurality of bag bodies.

BACKGROUND ART

A bag processing device such as a bagging packaging machine, a spout attaching machine, or the like may be equipped with a storage unit referred to as a magazine that stores a plurality of empty bags. In the bag processing device provided with the magazine, empty bags are extracted from the magazine one by one or in units of a plurality of bags and sent to a downstream side, and packaging processing, spout sealing processing, or other processing is performed using each of the empty bags. Widely used as such a magazine are a vertical integration type magazine that stores a large number of empty bags in a state of being stacked in a vertical direction while retaining each of the empty bags in a horizontal attitude and a horizontal integration type magazine that stores a large number of empty bags in a state of being stacked in a horizontal direction while retaining each of the empty bags in an erect attitude. In a case where these types of magazines are used, an empty bag located at a highest position is lifted on a one-by-one basis from a single empty bag group or each of a plurality of empty bag groups stored in the magazines, and is used in a subsequent stage.

When a target empty bag among the plurality of empty bags thus superposed on each other is lifted, another empty bag disposed immediately below the target empty bag may be lifted together with the target empty bag. This phenomenon is referred to also as "two-sheet taking." When the other empty bag is thus unintentionally lifted together with the target empty bag, the other empty bag falls in an unintended region, or obstructs the extraction of a next empty bag, so that processing is hindered.

In order to avoid such a hindrance, Japanese Patent Laid-Open No. 2016-39262, Japanese Patent Laid-Open No. 2000-103411, Japanese Patent Laid-Open No. 2001-253411, and Japanese Patent Laid-Open No, 2000-327153 disclose turning mechanisms for appropriately lifting a target empty bag. Turning processing performed by a turning mechanism is processing of releasing close adhesion between the target empty bag and another empty bag disposed immediately below the target empty bag by separating only a part of the target empty bag from the other empty bag prior to lifting the whole of the target empty bag.

SUMMARY OF INVENTION

Technical Problem

In a case where a bag processing device provided with a magazine is used, the number of empty bags that can be stored in the magazine is limited, and therefore a worker needs to refill empty bags in appropriate timing as required while continuously monitoring the storage state of the empty bags in the magazine. Actually, in most cases, the worker needs to refill empty bags into the magazine at an appropriate time while paying attention to the storage state of the empty bags in the magazine at all times while the bag processing device is operating. Therefore a very heavy burden of refilling empty bags is imposed on the worker. When the bag processing device performs processing at high speed, in particular, empty bags are also consumed at high speed, so that the burden of the work of refilling empty bags on the worker is further increased. In addition, when the speed of refilling empty bags by the worker is slower than the processing speed of the bag processing device (that is, the speed of consumption of empty bags), the work of refilling empty bags becomes a bottleneck, and hinders improvement in processing capacity of the bag processing device.

Incidentally, the bag processing device does not necessarily need to be provided with a magazine. In a bag processing device not provided with a magazine, new empty bags need to be supplied to the bag processing device at an appropriate time so as to be operatively associated with the consumption of empty bags. The supply of empty bags to such a bag processing device is often performed manually as in the refilling of empty bags into the above-described magazine. A very heavy burden is imposed on the worker also in the case where empty bags are manually supplied to the bag processing device not provided with a magazine. Particularly when empty bags are not supplied to the bag processing device in appropriate timing due to the inattention of the worker or the like, processing in the bag processing device is interrupted, so that processing efficiency is decreased.

It is desired that in the work of refilling empty bags into the magazine and the work of supplying empty bags to the bag processing device as described above, the work be performed at high speed while the burden on the worker is reduced. It is therefore conceivable that a reduction in the burden on the worker and an increase in work speed may be achieved by sequentially refilling individual empty bags into the magazine or supplying individual empty bags to the bag processing device via a device such as a robot or the like while conveying a large number of empty bags in a stacked state. In this case, however, the above-described "two-sheet taking" phenomenon can occur, and therefore a hindrance such as interruption of work or the like can occur. In a stage preceding the magazine or a stage preceding the bag processing device, in particular, the orientations of empty bags may not be made uniform. In that case, it is very difficult to appropriately hold and lift individual empty bags while preventing the "two-sheet taking" phenomenon. In addition, even if the target empty bag is not superposed on another empty bag, the target empty bag may not be able to be lifted appropriately when the target empty bag closely adheres to a conveyance surface.

Thus, in order to achieve a reduction in burden and an increase in work speed, there is a desire for the proposition of a method and a device capable of appropriately lifting and transferring each bag body individually from among a plurality of bag bodies conveyed in a state of being superposed on each other while preventing the "two-sheet taking" phenomenon. In addition, there is a desire for the proposition of a method and a device capable of appropriately lifting and transferring the target empty bag by preventing a failure in lifting the target empty bag which failure is caused by close adhesion between the target empty bag and the conveyance surface. These methods and devices can appropriately supply bag bodies to the magazine or the bag processing device while conveying a large number of bag bodies at a time, and improve productivity by preventing a problem such as a device stop caused by a failure in transferring bag bodies or the like.

The present invention has been made in view of the above-described circumstances, and it is an object of the present invention to provide a pickup method and a pickup device that can appropriately lift a target bag body individually from among a plurality of conveyed bag bodies.

Solution to Problem

One aspect of the present invention is directed to a pickup method comprising the steps of: holding a target bag body among a plurality of bag bodies by a transfer device while the plurality of bag bodies are conveyed; and lifting a whole of the target bag body after lifting a part of the target bag body, wherein the transfer device is moved according to position suggestion data indicating a position of the target bag body, and liftably holds the target bag body.

The position suggestion data indicating an orientation of the target bag body in addition to the position of the target bag body may be obtained by a pickup control unit, and the transfer device may adjust a turning direction which is a direction of lifting the part of the target bag body, according to the position suggestion data under control of the pickup control unit.

The transfer device may include: a holding unit that liftably holds each of the plurality of bag bodies; a turning mechanism that makes the holding unit perform a turning operation of lifting the part of the target bag body; and a lifting mechanism that makes the holding unit perform a lifting operation of lifting the whole of the target bag body, and the turning mechanism may be adjusted according to the position suggestion data under control of the pickup control unit in such a manner that the turning direction relative to each of the plurality of bag bodies is substantially identical between the plurality of bag bodies.

A pickup device may further comprises: a transfer device that holds a target bag body among a plurality of bag bodies by a conveying device while the plurality of bag bodies are conveyed, and lifts a whole of the target bag body after lifting a part of the target bag body; and a pickup control unit that obtains position suggestion data indicating a position of the target bag body, and controls the transfer device on a basis of the position suggestion data, wherein the pickup control unit moves the transfer device according to the position suggestion data, and makes the transfer device liftably hold the target bag body.

The pickup control unit may obtain the position suggestion data indicating an orientation of the target bag body in addition to the position of the target bag body, and the pickup control unit may control the transfer device according to the orientation of the target bag body indicated by the position suggestion data in such a manner that a turning direction which is a direction in which the transfer device lifts the part of the target bag body is adjusted.

The transfer device may include: a holding unit that liftably holds each of the plurality of bag bodies; a turning mechanism that makes the holding unit perform a turning operation of lifting the part of the target bag body; and a lifting mechanism that makes the holding unit perform a lifting operation of lifting the whole of the target bag body, and the pickup control unit may adjust the turning mechanism according to the position suggestion data in such a manner that the turning direction relative to each of the plurality of bag bodies is substantially identical between the plurality of bag bodies.

The transfer device may include: a holding unit that liftably holds each of the plurality of bag bodies; a turning mechanism that makes the holding unit perform a turning operation of lifting the part of the target bag body; and a lifting mechanism that makes the holding unit perform a lifting operation of lifting the whole of the target bag body, and the lifting mechanism may include: a guiding shaft; a moving body that is fixedly attached to the turning mechanism and slidably attached to the guiding shaft, and moves together with the turning mechanism along the guiding shaft, and an elastic part that biases the moving body toward one end portion of the guiding shaft.

The lifting mechanism may have a parallel link robot.

The pickup control unit may obtain the position suggestion data on a basis of photographed image data of the plurality of bag bodies, the photographed image data being obtained by an imaging device.

According to the present invention, it is possible to appropriately lift a target bag body individually from among a plurality of conveyed bag bodies.

DESCRIPTION OF EMBODIMENTS

Embodiments of the present invention will hereinafter be described with reference to the drawings.

First Embodiment

Figure 1:
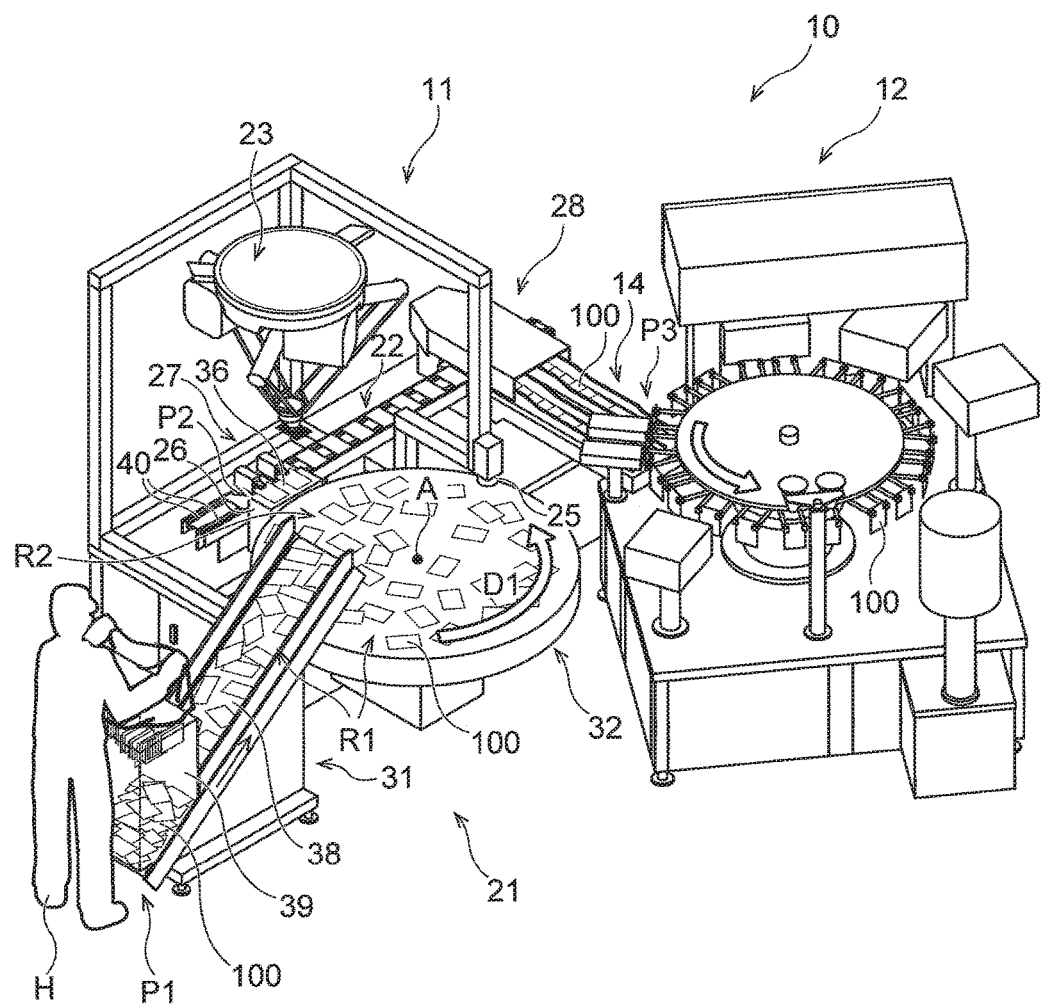
FIG. 1 is a perspective view showing an external appearance of a processing system according to a first embodiment.

FIG. 1 is a perspective view showing an external appearance of a processing system 10 according to a first embodiment.

The processing system 10 includes a bag conveying mechanism 11 and a bag processing device 12. A plurality of bag bodies 100 are conveyed by the bag conveying mechanism 11, and supplied to the bag processing device 12.

The bag bodies 100 according to the present embodiment are formed by empty bags. Each of the bag bodies 100 has only a bag mouth thereof opened, has a side wall portion on a top surface side and a side wall portion on an undersurface side thereof closely adhering to each other, and is conveyed by the bag conveying mechanism 11 in a sheet-like form as a whole. Incidentally, the bag body 100 does not necessarily need to be an empty bag, but may be conveyed by the bag conveying mechanism 11 in a state in which a substance in an arbitrary state is contained in the bag body 100. In addition, the inside and outside of the bag body 100 may communicate with each other via a part other than the bag mouth, or the inside and outside of the bag body 100 may be completely isolated from each other with the bag mouth sealed.

The bag processing device 12 performs processing using the bag bodies 100 supplied from the bag conveying mechanism 11. A concrete configuration and processing content; of the bag processing device 12 are not particularly limited. For example, the bag processing device 12 can be formed by a bagging device that puts contents into the bag bodies 100, a member attaching device that attaches a member such as a spout or the like to the bag bodies 100, a device that performs other processing using the bag bodies 100, or a combination of these devices. The bag processing device 12 shown in FIG. 1 intermittently or continuously revolves and conveys each bag body 100 such that each bag body 100 sequentially makes a circuit of a plurality of processing stations, and predetermined processing (for example content loading processing and sealing processing or the like) is performed at each of the processing stations.

The bag conveying mechanism 11 includes a first conveying device 21, a first transfer device 23, a relay support unit 26, a second conveying device 22, a second transfer device 28, and a magazine 14.

The first conveying device 21 conveys a plurality of bag bodies 100 such that the plurality of bag bodies 100 pass through a conveyance area R1 including a pickup region R2. The first conveying device 21 shown in FIG. 1 includes: an inclined conveyor 31 that conveys the plurality of bag bodies 100 linearly in an upwardly oblique direction; and a rotary table 32 that conveys the plurality of bag bodies 100 from the inclined conveyor 31 in a horizontal rotational direction D1.

The inclined conveyor 31 includes: an endless inclined belt 38 that runs linearly in an upwardly oblique direction from a position below the rotary table 32 to a position above the rotary table 32; and a loading unit 39 that guides the bag bodies 100 to a refilling position P1 of the inclined belt 38, the refilling position P1 being below the rotary table 32.

When a worker H loads a large number of bag bodies 100 into the loading unit 39, these bag bodies 100 are guided by the loading unit 39, and placed on the inclined belt 38. The loading unit 39 can for example have a box shape in which only a top portion and a bottom portion are opened or a shape in which a side portion on a running downstream side of the inclined belt 38 is opened in addition to the top portion and the bottom portion (that is, a shape formed by combining three flat plates erected in a vertical direction with each other). However, the configuration of the loading unit 39 is not limited, but the loading unit 39 may be formed by a hopper, a conveyor, a stocker, a loader, or the like.

The inclined belt 38 runs in an upwardly oblique direction from a start point position to an end point position in a state of being loaded with hag bodies 100, folds back at the end point position, runs in a downwardly oblique direction from the end point position to the start point position, folds back at the start point position, and runs from the start point position to the end point position again. The bag bodies 100 fall from the inclined belt 38 onto the rotary table 32 at the end position, and are loaded onto the rotary table 32. When the inclined belt 38 thus conveys the bag bodies 100 while running in the upwardly oblique direction, the bag bodies 100 are spread on the inclined belt 38 by being affected by gravity, so that the plurality of bag bodies 100 can be effectively prevented from being conveyed in a state of being superposed on one another. Hence, the worker H can load a large number of bag bodies 100 into the loading unit 39 without caring about the superposition of the bag bodies 100.

The rotary table 32 rotates about a rotation axis A extending in a vertical direction, and conveys the bag bodies 100 loaded on the rotary table 32. A top surface portion of the rotary table 32 on which top surface portion the bag bodies 100 are loaded extends in a horizontal direction, and is disposed below the end position of the inclined belt 38 in the vertical direction. In addition, a part of the top surface portion of the rotary table 32 is disposed directly below the end position of the inclined belt 38. Therefore, the bag bodies 100 falling from the inclined belt 38 at the end position land on the top surface portion of the rotary table 32.

The inclined conveyor 31 and the rotary table 32 may continuously convey the bag bodies 100 without stopping the conveyance of the bag bodies 100, may repeatedly turn on and off the conveyance of the bag bodies 100, or may intermittently convey the bag bodies 100. For example, a state of arrangement of the bag bodies 100 on the rotary table 32 may be detected from photographed image data of an imaging device 25 to be described later, and the conveyance by the inclined conveyor 31 and/or the rotary table 32 may be controlled to be turned on and off on the basis of the arrangement state. It is thereby possible to adjust the position at which the bag bodies 100 fall from the inclined conveyor 31 onto the rotary table 32, and arrange the bag bodies 100 so as to be dispersed uniformly on the rotary table 32. Incidentally, the inclined conveyor 31 and the rotary table 32 are controlled by a first conveyance driving control unit (see reference numeral "91" in FIG. 2) to be described later to adjust the on/off state of the conveyance, conveyance acceleration, conveyance speed, and the like.

The first conveying device 21 (the rotary table 32 in FIG. 1) according to the present embodiment thus conveys a plurality of bag bodies 100 in a rotational direction in at least a part (area including the pickup region R2 in particular) of the conveyance area R1. Thus, the plurality of bag bodies 100 can be conveyed so as to pass the same rotary conveyance area repeatedly, and the plurality of bag bodies 100 can be temporarily retained in the rotary conveyance area. In addition, because the rotary conveyance area includes the pickup region R2, an opportunity of picking up bag bodies 100 by the first transfer device 23 can be provided repeatedly.

An imaging device 25 is disposed above the rotary table 32. The imaging device 25 obtains image data by photographing the bag bodies 100 on the rotary table 32. A photographing range of the imaging device 25 may include only a part of the top surface portion of the rotary table 32, or may include the whole of the top surface portion of the rotary table 32. The imaging device 25 functions as a bag detecting unit (see reference numeral "34" in FIG. 2 to be described later) that obtains information indicating positions and orientations of the plurality of bag bodies 100 in the conveyance area R1 (particularly on the rotary table 32), and functions as an orientation information obtaining unit (see reference numeral "35" in FIG. 2 to be described later) that obtains information indicating orientations of top surfaces and undersurfaces of bag bodies 100 disposed on a mounting surface 36 of the relay support unit 26. That is, the photographed image data obtained by the imaging device 25 can be utilized as the information indicating the positions and orientations of the plurality of bag bodies 100 on the rotary table 32, and can be utilized as the information indicating the orientations of the top surfaces and undersurfaces of the bag bodies 100.

When the photographed image data obtained by the imaging device 25 is used to obtain these pieces of information, the photographed image data is analyzed. Although a concrete algorithm for this analysis is not particularly limited, various kinds of information can be obtained by typically performing image processing including an algorithm for detecting specific feature parts from the photographed image data.

For example, the information indicating the orientations of the top surfaces and undersurfaces of the bag bodies 100 can be obtained by providing the top surface and undersurface of each of the bag bodies 100 with respective unique features (for example specific print parts (for example characters, patterns, or the like), specific external shapes, or the like), and detecting the presence or absence of such unique features by analyzing the photographed image data. In addition, the information indicating the positions and orientations of the plurality of bag bodies 100 on the rotary table 32 can be obtained by providing each of the top surface and undersurface of each of the bag bodies 100 with a plurality of unique features at different positions, and detecting the presence or absence and relative position of such unique features by analyzing the photographed image data. In addition, by detecting the position of a unique feature provided to each bag body 100 by analyzing the photographed image data, it is possible to obtain information indicating a state of arrangement (for example a state of dispersion or the like) of the plurality of bag bodies 100 on the rotary table 32, and it is also possible to detect the position and orientation of a bag body 100 disposed at a highest position among the plurality of bag bodies 100 superposed on each other, for example.

Incidentally, a device that analyzes the photographed image data is not particularly limited. For example, the imaging device 25 may perform such analysis, a device such as a control unit or the like that actually uses information derived from the photographed image data may perform such analysis, or another device may perform such analysis.

At least a part of a region through which the plurality of bag bodies 100 conveyed by the rotary table 32 can pass is set in the pickup region R2. The pickup region R2 corresponds to a movable range of the first transfer device 23. The pickup region R2 may include only a part of the top surface portion of the rotary table 32 (particularly a predetermined range determined with the mounting surface 36 as a reference), or the pickup region R2 may include the whole of the top surface portion of the rotary table 32.

The first transfer device 23 picks up and holds a bag body 100 located in the pickup region R2 among the plurality of bag bodies 100 loaded on the rotary table 32, and carries the bag body 100 to a set position P2. Though a configuration of the first transfer device 23 is not particularly limited, the first transfer device 23 is provided so as to be movable three-dimensionally, and moves in a straight line and/or moves in a curved line in both of the horizontal direction and the vertical direction to carry the bag body 100 from a position on the rotary table 32 to the set position P2. The first transfer device 23 can be formed by combining a parallel link robot with a holding unit such as a suction cup or the like moved by the parallel link robot, for example. A mechanism other than the parallel link robot may be used as a mechanism for moving the holding unit, and for example the holding unit may be moved by an articulated robot. The holding unit can be formed by arbitrary means capable of controlling the holding and releasing of the bag body 100. Typically, the holding unit can be formed by an arbitrary device which can hold the bag body 100 by using a suction action based on a difference in atmospheric pressure, and which can release the bag body 100 by adjusting such a difference in atmospheric pressure.

Incidentally, a concrete example of configuration of the first transfer device 23 will be described later.

The first transfer device 23 corrects the orientation of the picked-up bag body 100, and then places the bag body 100 at the set position P2. A concrete method of the correction of the orientation of the bag body 100 by the first transfer device 23 is not particularly limited. Typically, the first transfer device 23 can correct the orientation of the bag body 100 by sucking an upward directed surface (that is, a side wall portion) of the top surface and undersurface of the bag body 100 on the rotary table 32, holding the bag body 100 in a horizontal state, and rotating the bag body 100 while maintaining the horizontal state. In this case, an amount of rotation of the bag body 100 is determined on the basis of information indicating the position and orientation of the bag body 100, the information being obtained by analyzing the photographed image data obtained by the imaging device 25.

The relay support unit 26 having the mounting surface 36 is provided at the set position P2, and the bag body 100 carried to the set position P2 by the first transfer device 23 is placed on the mounting surface 36. Precise positional relation between the set position P2 and the mounting surface 36 is not particularly limited as long as the bag body 100 released from the first transfer device 23 at the set position P2 can be placed in a desired orientation on the mounting surface 36. Two bag bodies 100 can be arranged on the mounting surface 36 shown in FIG. 1. Incidentally, while two (that is, a plurality of) bag bodies 100 are placed on the mounting surface 36 by one first transfer device 23 in the bag conveying mechanism 11 shown in FIG. 1, only one bag body 100 may be placed on the mounting surface 36 by one first transfer device 23, or two or more bag bodies 100 may be placed on the mounting surface 36 by two or more first transfer devices 23.

An inverting mechanism 27 holds the bag bodies 100 disposed on the mounting surface 36, and can mutually interchange the orientations of the top surfaces of the bag bodies 100 and the orientations of the undersurfaces of the bag bodies 100 as required. Though a concrete configuration of the inverting mechanism 27 is not particularly limited, the inverting mechanism 27 interchanges the orientations of the top surfaces of the bag bodies 100 disposed on the mounting surface 36 and the orientations of the undersurfaces of the bag bodies 100 disposed on the mounting surface 36 as required on the basis of the "information indicating the orientations of the top surfaces and undersurfaces of the bag bodies 100," the information being obtained by analyzing the photographed image data obtained by the imaging device 25.

The second conveying device 22 conveys the bag bodies 100 received from the inverting mechanism 27 to the second transfer device 28 arranged on a downstream side. The second conveying device 22 shown in FIG. 1 includes two endless second conveying belts 40. These second conveying belts 40 run in a same direction at a constant speed, and are arranged so as to be separated from each other in a direction perpendicular and horizontal to a running direction. Each of the bag bodies 100 is loaded from the inverting mechanism 27 onto the second conveying belts 40, and is conveyed to the second transfer device 28 together with the second conveying belts 40. Incidentally, while the second conveying device 22 shown in FIG. 1 conveys the bag bodies 100 to the downstream side linearly, a conveyance track and a conveyance system of the second conveying device 22 for the bag bodies 100 are not particularly limited. For example, the second conveying belts 40 may convey the bag bodies 100 continuously, or may convey the bag bodies 100 intermittently. In a case where the second conveying device 22 (that is, the second conveying belts 40) conveys the bag bodies 100 continuously at a constant speed, in particular, there is no acceleration nor deceleration at a time of the conveyance of the bag bodies 100, and a constant inertial force acts on the bag bodies 100, so that disturbances in position and orientation of the bag bodies 100 at the time of the conveyance can be prevented effectively. In addition, the bag bodies 100 may be handed over from the mounting surface 36 onto the second conveying belts 40 at a time of an intermittent stop of the second conveying belts 40. In addition, the bag bodies 100 may be handed over from the second conveying belts 40 to the second transfer device 28 at a time of an intermittent stop of the second conveying belts 40.

The second transfer device 28 transfers the bag bodies 100 from the second conveying device 22 to the magazine 14, and stores the bag bodies 100 in the magazine 14. The magazine 14 is capable of storing a plurality of bag bodies 100, and sequentially stores bag bodies 100 sent by the second transfer device 28. In addition, the magazine 14 sequentially feeds the stored bag bodies 100 to a downstream side, and places one or a plurality of bag bodies 100 (two bag bodies 100 in FIG. 1) at a handing-over position P3. A handing-over device not shown hands over the one or plurality of bag bodies 100 placed at the handing-over position P3 to the bag processing device 12 (a pair of chuck units gripping both side edge portions of each bag body 100 in the bag processing device 12 shown in FIG. 1).

Description will next be made of control units that control respective parts of the bag conveying mechanism 11 described above.

Figure 2:
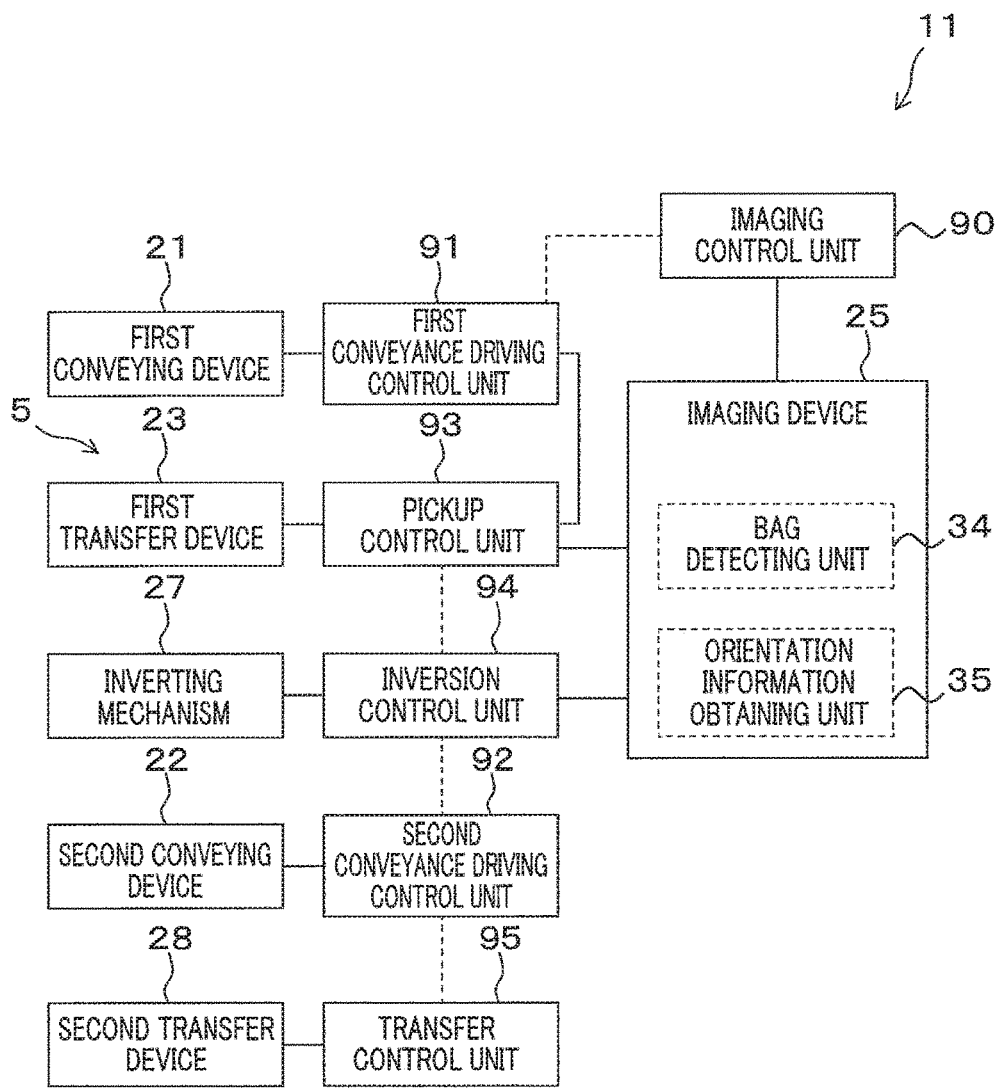
FIG. 2 is a block diagram showing control units according to the first embodiment.

FIG. 2 is a block diagram showing control units according to the first embodiment.

The bag conveying mechanism 11 has a first conveyance driving control unit 91 that controls the first conveying device 21, a second conveyance driving control unit 92 that controls the second conveying device 22, a pickup control unit 93 that controls the first transfer device 23, an inversion control unit 94 that controls the inverting mechanism 27, a transfer control unit 95 that controls the second transfer device 28, and an imaging control unit 90 that controls the imaging device 25. These control units control the corresponding devices and mechanisms to implement each process described above and each process to be described later.

Incidentally, each of these control units shown in FIG. 2 can be formed by a control apparatus including an arithmetic processing device (for example an MPU: Micro-Processing Unit), a non-transitory memory and/or a temporary memory storing a program and data, and another device. In addition, a part or the whole of these control units may be formed by a single control apparatus. In addition, a part or the whole of these control units may be controlled by another integrated controller, and a plurality of devices and mechanisms may be associated with each other and driven under control of the integrated controller.

The pickup control unit 93 in particular obtains position suggestion data from the first conveyance driving control unit 91, the position suggestion data being information directly or indirectly indicating the position of at least one or more bag bodies 100 of the plurality of bag bodies 100 in the conveyance area R1 (the conveyance area R1 formed by the rotary table 32 in FIG. 1). The pickup control unit 93 of the bag conveying mechanism 11 shown in FIG. 1 obtains position suggestion data from the first conveyance driving control unit 91, the position suggestion data being information about the rotational state and rotational speed (including rotational acceleration) of the rotary table 32. In addition, the pickup control unit 93 according to the present embodiment obtains position suggestion data, which is information directly or indirectly indicating the positions and orientations of the plurality of bag bodies 100 on the rotary table 32, on the basis of the photographed image data of the plurality of bag bodies, the photographed image data being obtained by the imaging device 25. The position suggestion data obtained from the imaging device 25 may be the photographed image data itself, or may be other data derived from the photographed image data. The pickup control unit 93 may directly obtain the photographed image data output from the imaging device 25, or may indirectly obtain the photographed image data via another device such as the imaging control unit 90 or the like. The pickup control unit 93 derives the position and orientation of a pickup target bag body 100 in the conveyance area R1 (the pickup region R2 in particular) on the basis of these pieces of position suggestion data obtained from the first conveyance driving control unit 91 and the imaging device 25.

Specifically, the pickup control unit 93 can derive the position of the pickup target bag body 100 in the pickup region R2 by comprehensively considering the position of the bag body 100 at a time of photographing of the imaging device 25 and the rotational state and rotational speed of the rotary table 32. In addition, the pickup control unit 93 can derive the orientation of the pickup target bag body 100 in the pickup region R2 by comprehensively considering the position and orientation of the bag body 100 at the time of photographing of the imaging device 25 and the rotational state and rotational speed of the rotary table 32. The pickup control unit 93 controls the first transfer device 23 to make the first transfer device 23 hold and pick up the target bag body 100 on the basis of position suggestion data suggesting information about the thus derived position and orientation of the pickup target bag body 100 in the conveyance area R1 (the pickup region R2 in particular). The pickup control unit 93 according to the present embodiment thus controls the first transfer device 23 on the basis of the position suggestion data derived from information obtained from the imaging device 25 (that is, the bag detecting unit 34) in addition to the position suggestion data obtained from the first conveyance driving control unit 91.

In addition, the inversion control unit 94 determines the necessity of interchanging the orientations of the top surfaces of the bag bodies 100 disposed on the mounting surface 36 and the orientations of the undersurfaces of the bag bodies 100 disposed on the mounting surface 36 on the basis of the information indicating the orientations of the bag bodies 100, the information being obtained from the imaging device 25, and makes the inverting mechanism 27 interchange the orientations of the top surfaces of the bag bodies 100 and the orientations of the undersurfaces of the bag bodies 100 only when determining that the interchange is necessary. The information indicating the orientations of the bag bodies 100 may be the photographed image data itself, or may be information data derived from the photographed image data.

Incidentally, transmission and reception of data (that is, information) may be performed between the control units shown in FIG. 2 and between the control units and the devices as required. For example, the first conveyance driving control unit 91 can detect a state (for example a state of dispersion or the like) of the bag bodies 100 on the rotary table 32 by obtaining the photographed image data from the imaging device 25 and analyzing the photographed image data. In addition, the inversion control unit 94 can actuate the inverting mechanism 27 according to a state of actuation of the first transfer device 23 by obtaining data indicating the state of actuation of the first transfer device 23 from the pickup control unit 93. In addition, the second conveyance driving control unit 92 can actuate the second conveying device 22 according to a state of actuation of the inverting mechanism 27 by obtaining data indicating the state of actuation of the inverting mechanism 27 from the inversion control unit 94. In addition, the transfer control unit 95 can actuate the second transfer device 28 according to a state of actuation of the second conveying device 22 by obtaining data indicating the state of actuation of the second conveying device 22 from the second conveyance driving control unit 92. In addition, the imaging control unit 90 can actuate the imaging device 25 to make the imaging device 25 perform photographing or the like according to a state of actuation of the first conveying device 21 (the rotary table 32 in particular) by obtaining data indicating the state of actuation of the first conveying device 21 (the rotary table 32 in particular) from the first conveyance driving control unit 91.

[Pickup Device]

A pickup device 5 including the above-described first transfer device 23 and the pickup control unit 93 controlling the first transfer device 23 will next be described in further detail.

The first transfer device 23 according to the present embodiment holds a target bag body 100 among the plurality of bag bodies 100 conveyed by the first conveying device 21 (the rotary table 32 in particular) in the pickup region R2, performs a "turning operation" of lifting a part of the target bag body 100, and thereafter performs a "lifting operation" of lifting the whole of the target bag body 100. Specifically, the turning operation is performed by separating a part of the target bag body 100 from a supporting surface immediately below, and the lifting operation is performed by separating the whole of the target bag body 100 from the supporting surface immediately below. In a case where the target bag body 100 is conveyed by the rotary table 32 without being superposed on another bag body 100, for example, the turning operation and the lifting operation are performed by separating a part and the whole of the target bag body 100 from the top surface of the rotary table 32. In addition, in a case where the target bag body 100 is conveyed by the rotary table 32 in a state of being superposed on another bag body 100, the turning operation and the lifting operation are performed by separating a part and the whole of the target bag body 100 from the other bag body 100 immediately below.

The pickup control unit 93 obtains the position suggestion data indicating the position of the target bag body 100 in the pickup region R2, and controls the first transfer device 23 on the basis of the position suggestion data. Specifically, the pickup control unit 93 moves the first transfer device 23 according to the position suggestion data, and makes the first transfer device 23 liftably hold the target bag body 100 in the pickup region R2.

In particular, the pickup control unit 93 according to the present embodiment obtains the position suggestion data indicating the orientation of the target bag body 100 in the pickup region R2 in addition to the position of the target bag body 100 in the pickup region R2. The pickup control unit 93 then controls the first transfer device 23 according to the position suggestion data indicating the position and orientation of the target bag body 100 in the pickup region R2, so that a turning direction in the turning operation is adjusted. The "turning direction" referred to herein is a direction in which the first transfer device 23 lifts a part of the target bag body 100, and means a direction in which a sucking part (see reference numeral "55" in FIG. 9) of the first transfer device 23 is inclined in the turning operation, as will be described later.

In the present embodiment, the photographed image data of the plurality of bag bodies 100 on the rotary table 32, the photographed image data being obtained by the above-described imaging device 25 (see FIG. 1), is sent to the pickup control unit 93, and rotational state data of the rotary table 32 (for example data on the on and off states of rotation of the rotary table 32 and data on the rotational speed of the rotary table 32 or the like) is sent from the first conveyance driving control unit 91 to the pickup control unit 93. The pickup control unit 93 can derive the position suggestion data indicating the position and orientation of the target bag body 100 in the pickup region R2 on the basis of the photographed image data from the imaging device 25 and the rotational state data from the first conveyance driving control unit 91.

[Transfer Device]

An example of configuration of the first transfer device 23 will next be described.

Figure 3:
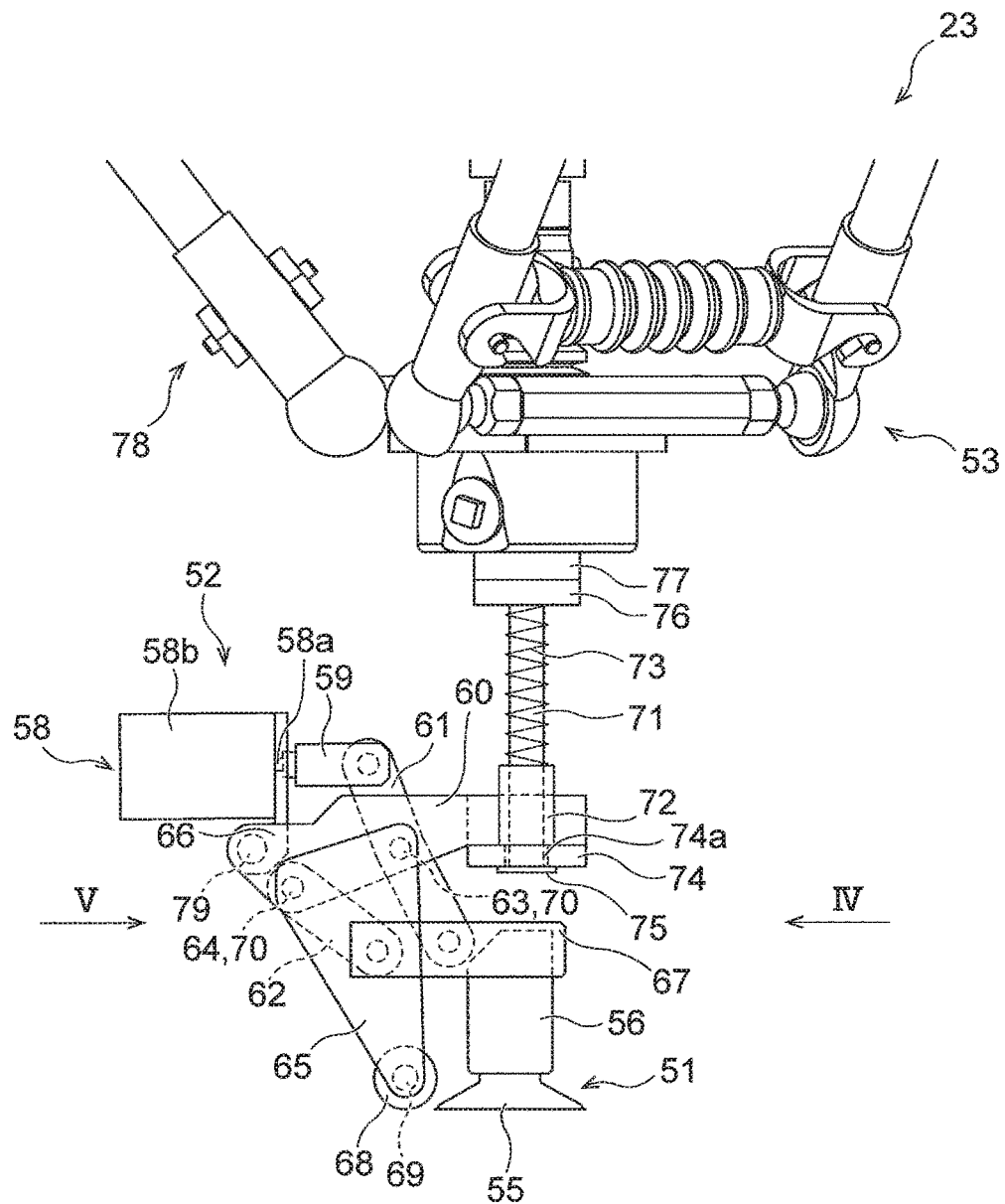
FIG. 3 is a configuration diagram showing an example of a first transfer device.
Figure 4:
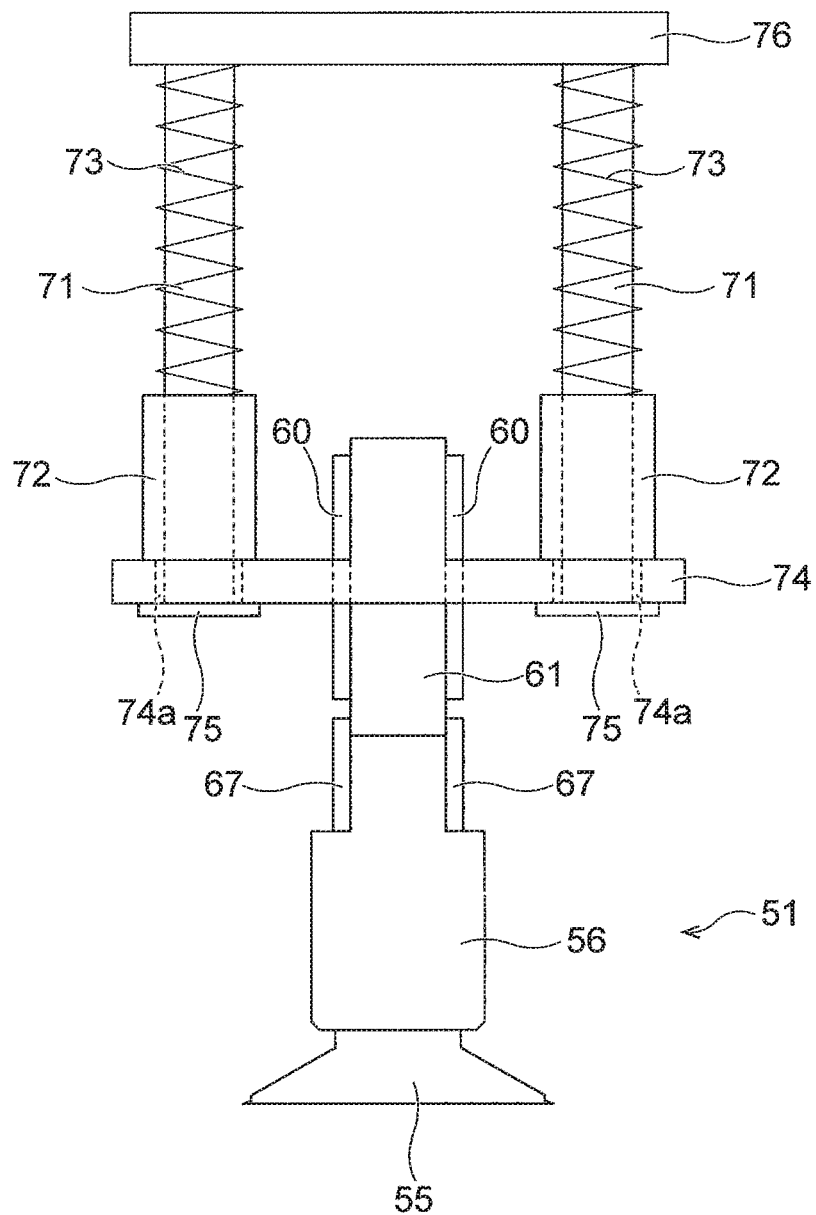
FIG. 4 is a partial configuration diagram showing a state in which the first transfer device is viewed from a direction indicated by an arrow "IV" in FIG. 3.
Figure 5:
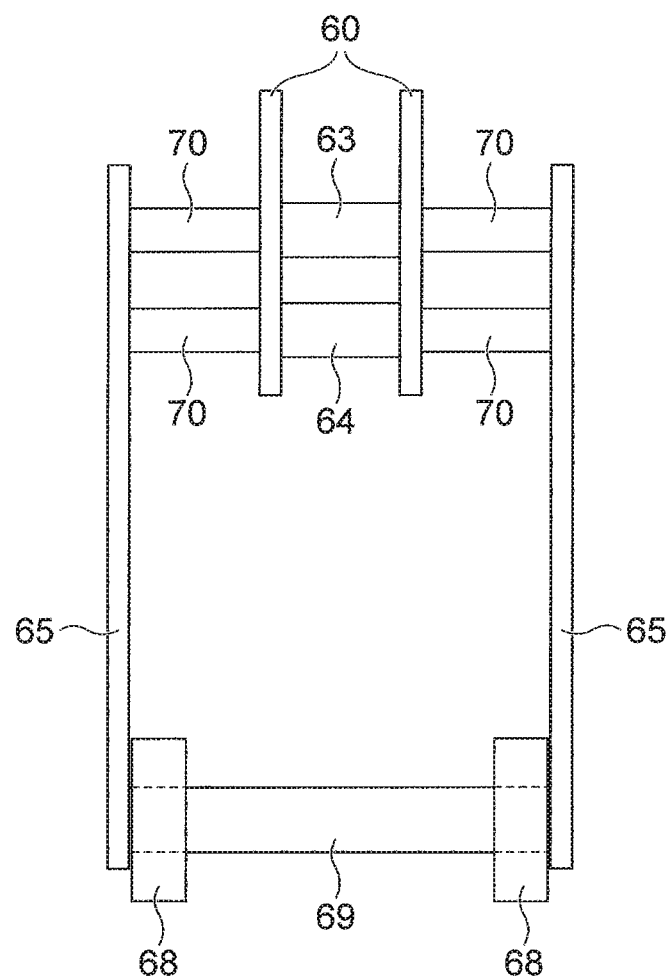
FIG. 5 is a partial configuration diagram showing a state in which the first transfer device is viewed from a direction indicated by an arrow "V" in FIG. 3.
Figure 6:
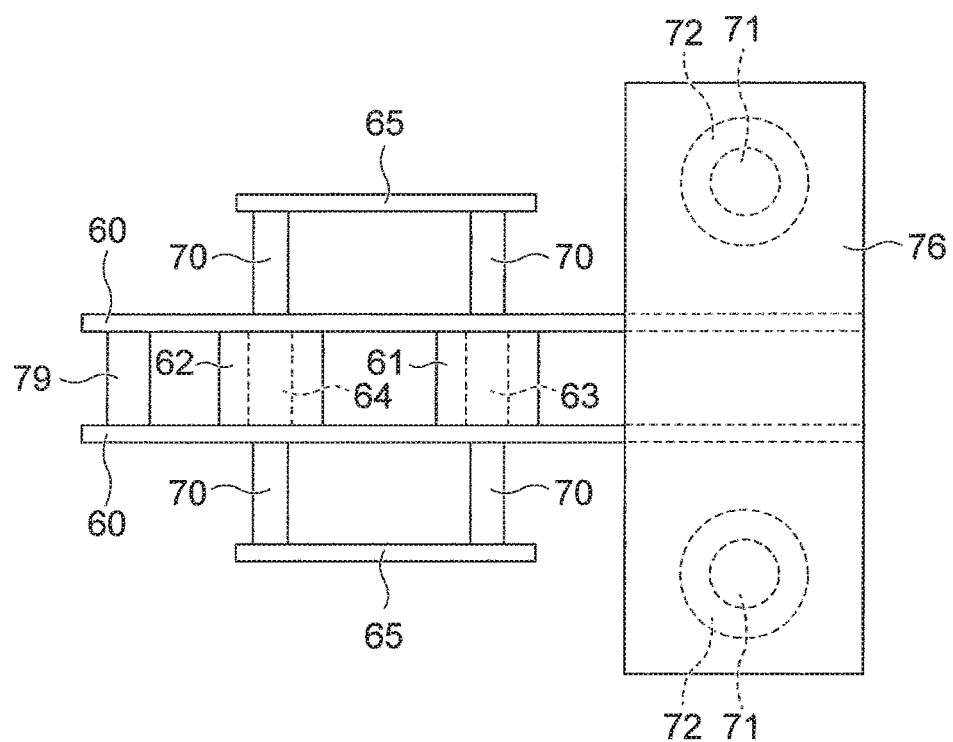
FIG. 6 is a partial configuration diagram showing a state in which vicinities of a turning mechanism of the first transfer device are viewed from above.

FIG. 3 is a configuration diagram showing an example of the first transfer device 23. FIG. 4 is a partial configuration diagram showing a state in which the first transfer device 23 is viewed from a direction indicated by an arrow "IV" in FIG. 3. FIG. 5 is a partial configuration diagram showing a state in which the first transfer device 23 is viewed from a direction indicated by an arrow "V" in FIG. 3. FIG. 6 is a partial configuration diagram showing a state in which vicinities of a turning mechanism 52 of the first transfer device 23 are viewed from above. Incidentally, in order to facilitate understanding, FIGS. 3 to 6 show both of parts representing a state of external appearance and parts representing an internal structure, and include drawings in which a part of constituent members are not shown.

The first transfer device 23 has a holding unit 51, a turning mechanism 52, and a lifting mechanism 53.

The holding unit 51 can liftably hold each of the plurality of bag bodies 100. A concrete holding method of the holding unit 51 is not limited. The holding unit 51 shown in FIGS. 3 to 6 includes a sucking part 55 formed by a suction cup and a suction attachment block 56 fixedly supporting the sucking part 55. The suction attachment block 56 can set the inside of the sucking part 55 to a negative pressure by sucking an air from the inside of the sucking part 55, whereas the suction attachment block 56 can set the inside of the sucking part 55 to an atmospheric pressure by allowing the inside of the sucking part 55 to communicate with the outside of the sucking part 55. Hence, the sucking part 55 sucks and releases the target bag body 100 by adjusting air pressure inside the sucking part 55 by the suction attachment block 56 under control of the pickup control unit 93.

Incidentally, the sucking part 55 may be formed by a member of rubber or the like excellent in elasticity and adhesion. In this case, it is possible to make the sucking part 55 suck the target bag body 100 appropriately while using deformation and elasticity of the sucking part 55 by merely pressing the sucking part 55 against the target bag body 100 without the suction attachment block 56 actively sucking an air from the inside of the sucking part 55. In this case, the suction attachment block 56 does not need to have a configuration for actively sucking an air from the inside of the sucking part 55, and it suffices for the suction attachment block 56 to be able to effect communication and isolation between the inside and outside of the sucking part 55 as required.

The turning mechanism 52 makes the holding unit 51 perform the turning operation of lifting a part of the target bag body 100. The turning mechanism 52 shown in FIGS. 3 to 6 includes an air cylinder 58 as a driving source of the turning operation and a link mechanism coupled to a piston rod 58a of the air cylinder 58 and coupled to the suction attachment block 56 of the holding unit 51.

The air cylinder 58 can adjust an amount of projection of the piston rod 58a (that is, an amount of extension or contraction of the piston rod 58a) from a cylinder main body 58b under control of the pickup control unit 93 (see FIG. 2). A coupling block 59 is fixedly attached to the piston rod 58a, and a first lever 61 included in the link mechanism is rotatably coupled to the coupling block 59. The link mechanism is therefore actuated according to the amount of extension or contraction of the piston rod 58a. On the other hand, an air cylinder attachment plate 66 is fixedly attached to the air cylinder 58 (the cylinder main body 58b in particular), and the air cylinder attachment plate 66 is fixedly attached to two fixed plates 60 included in the link mechanism via an attachment shaft 79. Hence, the air cylinder 58 is fixed to each of the fixed plates 60 via the air cylinder attachment plate 66, and moves together with the fixed plates 60.

The link mechanism provided to the turning mechanism 52 includes: the first lever 61 and a second lever 62 swingably provided to the two fixed plates 60; two tilting blocks 67 whose attitude is determined according to swinging states of the first lever 61 and the second lever 62; and two roller attachment plates 65 fixedly provided to the two fixed plates 60.

As shown in FIG. 5 and FIG. 6, the roller attachment plates 65 corresponding to the respective fixed plates 60 are fixed, each via two fixing shafts 70, to the respective fixed plates 60. Spaces can be created between the fixed plates 60 and the roller attachment plates 65 by thus fixing the roller attachment plates 65 to the fixed plates 60 via the fixing shafts 70, and a distance between the roller attachment plates 65 can be adjusted by changing the shaft length of the fixing shafts 70.

A first rotating shaft 63 and a second rotating shaft 64 are arranged between the two fixed plates 60, both end portions of the first rotating shaft 63 are fixedly attached to the respective fixed plates 60, and both end portions of the second rotating shaft 64 are fixedly attached to the respective fixed plates 60. The first rotating shaft 63 rotatably supports the first lever 61, and the second rotating shaft 64 rotatably supports the second lever 62.

As shown in FIG. 3, one end portion of the first lever 61 is rotatably coupled to the coupling block 59, and is coupled to the piston rod 58a via the coupling block 59. Other end portion of the first lever 61 is rotatably coupled to the tilting blocks 67, and is coupled to the sucking part 55 via the tilting blocks 67 and the suction attachment block 56. An intermediate part between the one end portion and the other end portion of the first lever 61 is rotatably coupled to each of the fixed plates 60 via the first rotating shaft 63. On the other hand, one end portion of the second lever 62 is rotatably attached to each of the fixed plates 60 via the second rotating shaft 64, and other end portion of the second lever 62 is rotatably attached to the two tilting blocks 67 via a support shaft. Hence, the first lever 61, the second lever 62, and the tilting blocks 67 are swingably provided to the fixed plates 60, but move in the vertical direction together with the fixed plates 60.

Each of the tilting blocks 67 is formed by a plate-shaped member, and the first lever 61 and the second lever 62 are rotatably coupled to each of the tilting blocks 67. The two tilting blocks 67 assume an attitude corresponding to the state of the link mechanism (the first lever 61 and the second lever 62 in particular), and integrally operate according to the amount of extension or contraction of the piston rod 58a. When the amount of projection of the piston rod 58a is a minimum, for example, each of the tilting blocks 67 assumes an attitude extending in the horizontal direction (see FIG. 3). When the amount of projection of the piston rod 58a is a maximum, on the other hand, each of the tilting blocks 67 is tilted so as to form an angle of other than 0° with respect to the horizontal direction. The suction attachment block 56 is fixed to the tilting blocks 67 and exhibits a same behavior as the tilting blocks 67, and performs the turning operation together with the holding unit 51 when the tilting blocks 67 are tilted.

The two roller attachment plates 65 are fixedly attached to the fixed plates 60 via the fixing shafts 70, and a roller shaft 69 (see FIG. 5) is disposed between the two roller attachment plates 65. Both end portions of the roller shaft 69 are fixedly attached to the two roller attachment plates 65, respectively, and rollers 68 are rotatably attached to both respective end portions of the roller shaft 69.

The lifting mechanism 53 makes the holding unit 51 perform the lifting operation of lifting the whole of the target bag body 100. The lifting operation referred to herein can include not only linear operations but also three-dimensional operations in the vertical direction, the horizontal direction, directions different from these directions, or a plurality of directions. Hence, the lifting mechanism 53 may have a parallel link robot, for example, and the lifting operation may be performed by making the holding unit 51 operate three-dimensionally by the parallel link robot.

The lifting mechanism 53 shown in FIGS. 3 to 6 includes two guiding shafts 71, one stopper block 74 (moving body), and two compression springs (elastic parts) 73. The two guiding shafts 71 are arranged at positions separate from each other in the horizontal direction, and each of the guiding shafts 71 extends in the vertical direction. The stopper block 74 is fixedly attached to the turning mechanism 52 (the fixed plates 60 in particular), and is slidably attached to each of the guiding shafts 71. That is, each of the fixed plates 60 is fixed to the stopper block 74, and moves along the guiding shafts 71 together with the stopper block 74. The stopper block 74 thus moves along each of the guiding shafts 71 together with the turning mechanism 52. The stopper block 74 shown in the figures has a T-shaped sectional shape (see FIG. 4), two through holes 74a are formed in the stopper block 74, and the guiding shafts 71 extend so as to penetrate the corresponding through holes 74a.

A common first transfer coupling portion 76 is fixedly attached to one end portions of the two guiding shafts 71., and two sliding members 72 slidably attached to the respective guiding shafts 71 are provided between the first transfer coupling portion 76 and the stopper block 74. A second transfer coupling portion 77 of a three-dimensional transfer mechanism 78 that can be formed by a parallel link robot, an articulated robot, or the like is fixed to the first transfer coupling portion 76. The three-dimensional transfer mechanism 78 can three-dimensionally move the turning mechanism 52 and the holding unit 51 coupled to the first transfer coupling portion 76 by three-dimensionally moving the second transfer coupling portion 77. The three-dimensional transfer mechanism 78 can also rotate the turning mechanism 52 and the holding unit 51 coupled to the first transfer coupling portion 76 about an axis extending in the vertical direction by rotating the second transfer coupling portion 77 about the axis. Incidentally, this axis passes through the central position of each of the second transfer coupling portion 77 and the first transfer coupling portion 76. On the other hand, end stoppers 75 respectively provided as separate bodies are fixedly attached to other end portions of the two guiding shafts 71. The end stoppers 75 have a larger diameter than the diameter of the corresponding through holes 74a formed in the stopper block 74, and thus prevent the stopper block 74 from falling off the guiding shafts 71.

The two compression springs 73 are arranged between the first transfer coupling portion 76 and the stopper block 74 (particularly between the first transfer coupling portion 76 and the sliding members 72), and the compression springs 73 are provided so as to be penetrated by the corresponding guiding shafts 71. The compression springs 73 apply an elastic force produced by a compression state (which elastic force will hereinafter be referred to also as a "compression elastic force") to the first transfer coupling portion 76 and the sliding members 72, and bias the stopper block 74 toward one end portions of the guiding shafts 71 (end portions on a lower side in the vertical direction in the first transfer device 23 shown in the figures) via the sliding members 72.

Description will next be made of the turning operation and the lifting operation performed by the first transfer device 23. Incidentally, the turning operation and the lifting operation to be described in the following are performed by control of the first transfer device 23 by the pickup control unit 93.

FIGS. 7 to 10 are diagrams of assistance in explaining actuation of the first transfer device 23, and are diagrams showing only a part of the elements of the first transfer device 23. Incidentally, while FIGS. 7 to 10 show a state in which a large number of bag bodies 100 are stacked on the rotary table 32 in the vertical direction in an orderly manner in order to facilitate understanding, two or more bag bodies 100 in a state of being superposed on each other in a disorderly manner or bag bodies 100 not superposed on other bag bodies 100 can be actually conveyed while loaded on the rotary table 32.

Figure 7:
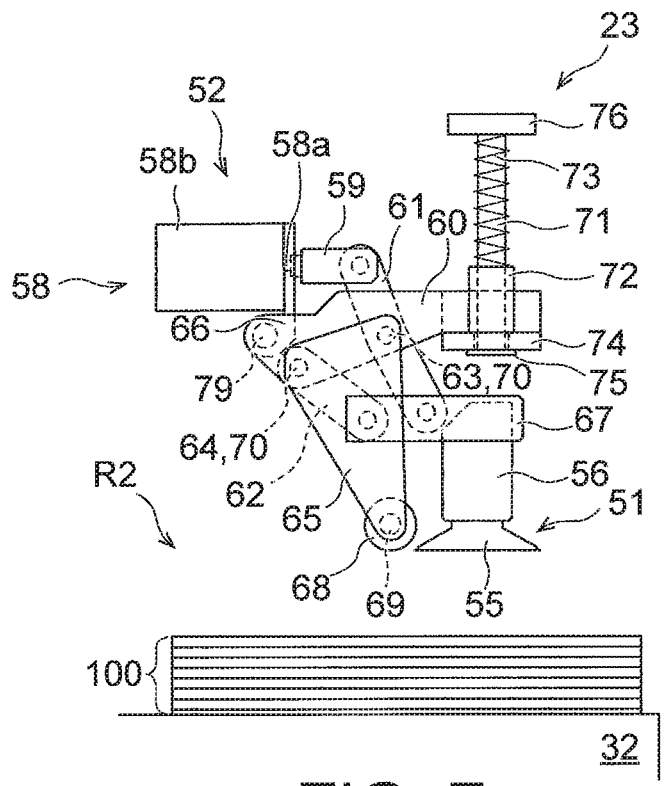
FIG. 7 is a diagram of assistance in explaining the actuation of the first transfer device.

First, the whole of the first transfer device 23 is moved by the three-dimensional transfer mechanism 78 (see FIG. 3), and disposed above a target bag body 100 being conveyed by the rotary table 32 (see FIG. 7). At this time, each of the sliding members 72 and the stopper block 74 is disposed at a lowest portion of the guiding shafts 71 under the effect of the compression elastic forces of the compression springs 73, and the stopper block 74 is in contact with and supported by each of the end stoppers 75. In addition, the amount of projection of the piston rod 58a is adjusted to a minimum, so that the tilting blocks 67 assume an attitude extending in the horizontal direction and the sucking part 55 is directed downward in the vertical direction. Incidentally, in this state, the sucking part 55 is preferably disposed slightly below the rollers 68 in the vertical direction. In this case, a distance between the sucking part 55 and the rollers 68 in the vertical direction is preferably determined according to a distance by which the sucking part 55 is bent and displaced in the vertical direction when the sucking part 55 is made to closely adhere to and suck the target bag body 100 by pressing the sucking part 55 against the target bag body 100.

When the target bag body 100 is moving together with the rotary table 32 in the present process and processes to be described in the following, the three-dimensional transfer mechanism 78 moves the first transfer device 23 such that the first transfer device 23 (the sucking part 55 in particular) follows the target bag body 100. Incidentally, when a plurality of bag bodies 100 are arranged on the first conveying device 21 (that is, the rotary table 32) in a state of being superposed on each other in a disorderly manner, the pickup control unit 93 detects the position and orientation of a bag body 100 located at a highest position by analyzing the photographed image data sent from the imaging device 25, and sets the bag body 100 located at the highest position as the pickup target bag body 100.

Figure 8:
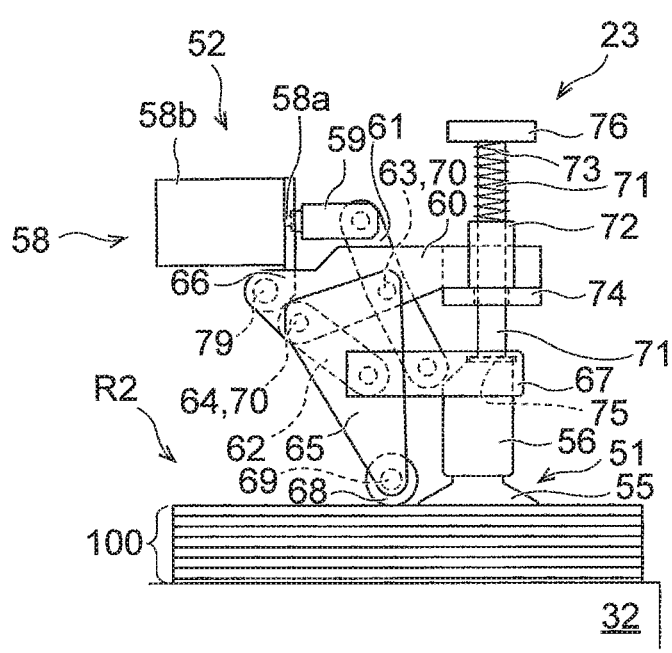
FIG. 8 is a diagram of assistance in explaining the actuation of the first transfer device.

Then, the whole of the first transfer device 23 is moved downward by the three-dimensional transfer mechanism 78, the sucking part 55 is disposed at a suction position in the pickup region R2, and the sucking part 55 is brought into contact with an upward directed surface of the target bag body 100 being conveyed by the rotary table 32 (see FIG. 8). At this time, the sucking part 55 can be surely adhered closely to the target bag body 100 by making the sucking part 55 touch the target bag body 100 before the rollers 68.

The three-dimensional transfer mechanism 78 increases a degree of close adhesion of the sucking part 55 to the target bag body 100 by further depressing the guiding shafts 71 downward in the vertical direction via the first transfer coupling portion 76. At this time, the position in the vertical direction of the fixed plates 60 is determined according to the position in the vertical direction of the rollers 68, while the position in the vertical direction of the rollers 68 is determined according to the position in the vertical direction of the target bag body 100, so that the position in the vertical direction of the fixed plates 60 hardly varies. Therefore, the stopper block 74 and the sliding members 72 move upward in the vertical direction with respect to the guiding shafts 71, and further compress the compression springs 73. Biasing forces corresponding to the compression elastic forces of the compression springs 73 can be made to act on the sucking part 55 and the rollers 68 by thus depressing the guiding shafts 71 via the first transfer coupling portion 76 so as to compress the compression springs 73. It is thereby possible to bring the sucking part 55 and the rollers 68 into contact with the target bag body 100 surely, and closely adhere the sucking part 55 to the target bag body 100 appropriately. Incidentally, it is preferable from a viewpoint of preventing damage to the end stoppers 75 and the suction attachment block 56 that the three-dimensional transfer mechanism 78 depress the guiding shafts 71 downward in the vertical direction via the first transfer coupling portion 76 to such a degree that the end stoppers 75 do not come into contact with the suction attachment block 56.

As a result of the first transfer device 23 undergoing the states shown in FIG. 7 and FIG. 8, the sucking part 55 can be tightly and closely adhered to a part of the target bag body 100 in a state in which the rollers 68 press the target bag body 100. The suction attachment block 56 adjusts the inside of the sucking part 55 to a negative pressure under control of the pickup control unit 93 before the sucking part 55 comes into contact with the target bag body 100, at the same time as the sucking part 55 comes into contact with the target bag body 100, or after the sucking part 55 comes into contact with the target bag body 100. The target bag body 100 is sucked by the sucking part 55 by making the sucking part 55 whose inside is in a state of the negative pressure adhere to the target bag body 100.

Figure 9:
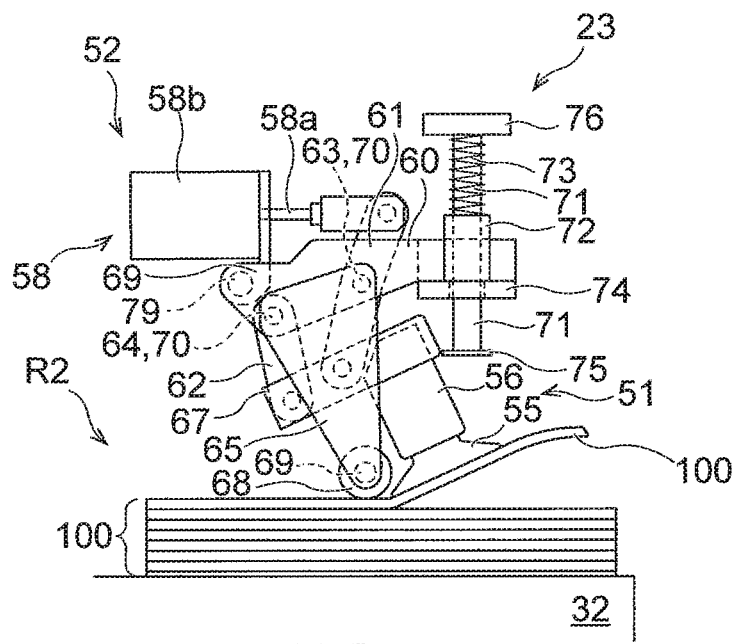
FIG. 9 is a diagram of assistance in explaining the actuation of the first transfer device.
Figure 10:
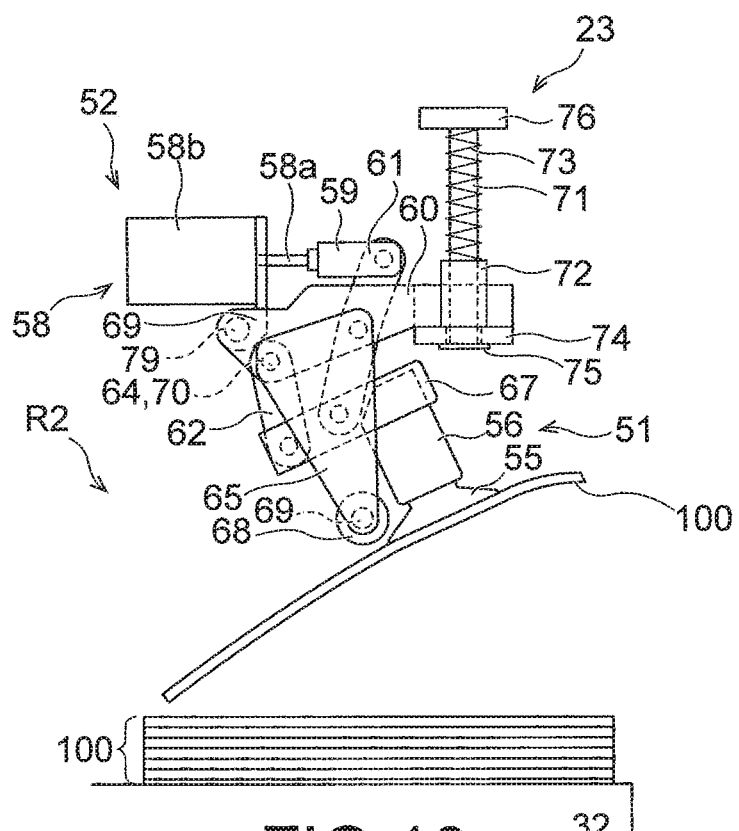
FIG. 10 is a diagram of assistance in explaining the actuation of the first transfer device.

Then, in a state in which the sucking part 55 of the first transfer device 23 holds the target bag body 100 among the plurality of bag bodies 100 conveyed in the pickup region R2, a turning process of lifting a part of the target bag body 100 is performed (see FIG. 9), and thereafter a lifting process of lifting the whole of the target bag body 100 is performed (see FIG. 10).

In the turning process shown in FIG. 9, the air cylinder 58 is actuated to increase the amount of projection of the piston rod 58a in a state in which the three-dimensional transfer mechanism 78 depresses the guiding shafts 71. Thus, the first lever 61 swings about the first rotating shaft 63, the tilting blocks 67 are tilted as shown in FIG. 9, and the suction attachment block 56 and the sucking part 55 are also tilted together with the tilting blocks 67. Hence, the bag body 100 sucked by the sucking part 55 is also tilted and lifted together with the sucking part 55. On the other hand, the rollers 68 are not affected by the swinging of the first lever 61, the second lever 62, and the tilting blocks 67, and maintain the state of pressing the bag body 100 basically without changing in position. Therefore, when the sucking part 55 is tilted, a part of the target bag body 100 which part is sucked by the sucking part 55 is separated from another bag body 100 immediately below, whereas a part of the target bag body 100 which part is pressed by the rollers 68 maintains the state of adhering to the other bag body 100 immediately below. Only a part of the target bag body 100 is thus separated from the other bag body 100 immediately below, so that the turning operation for the bag body 100 is performed appropriately.

Incidentally, in the turning operation, the rollers 68 produce a force opposing a force produced by the compression elastic forces of the compression springs 73, and therefore the sucking part 55 can be tilted according to the swinging of the first lever 61 and the second lever 62 basically without receiving any force from below. If the rollers 68 are not provided, the force produced by the compression elastic forces of the compression springs 73 presses the sucking part 55 downward, and therefore the turning operation may not be performed appropriately.

Then, in the lifting process shown in FIG. 10, the three-dimensional transfer mechanism 78 moves the whole of the holding unit 51, the turning mechanism 52, and the lifting mechanism 53 upward in the vertical direction via the first transfer coupling portion 76 and the guiding shafts 71. Consequently, the compression of the compression springs 73 is relaxed, the target bag body 100 sucked by the sucking part 55 is lifted upward together with the first transfer device 23, and the whole of the target bag body 100 is separated from the other bag body 100 immediately below. Incidentally, in the lifting process, it is preferable to maintain a state in which a part of the target bag body 100 which part is lifted in the turning process is separated from the other bag body 100 immediately below. From a viewpoint of surely separating the target bag body 100 from the other bag body 100 immediately below, in particular, it is preferable in the lifting process to maintain or further increase the amount of projection of the piston rod 58a which amount is increased in the turning process, and maintain the tilting blocks 67, the suction attachment block 56, and the sucking part 55 in a tilted state. However, in the middle of the lifting process or after the lifting process, the attitude of the target bag body 100 sucked by the sucking part 55 may be set in the horizontal direction by reducing the amount of projection of the piston rod 58a.

The thus lifted target bag body 100 is three-dimensionally moved by the three-dimensional transfer mechanism 78, released from the first transfer device 23 at the set position P2 shown in FIG. 1, and placed on the mounting surface 36 of the relay support unit 26.

[Turning Direction]

Figure 11:
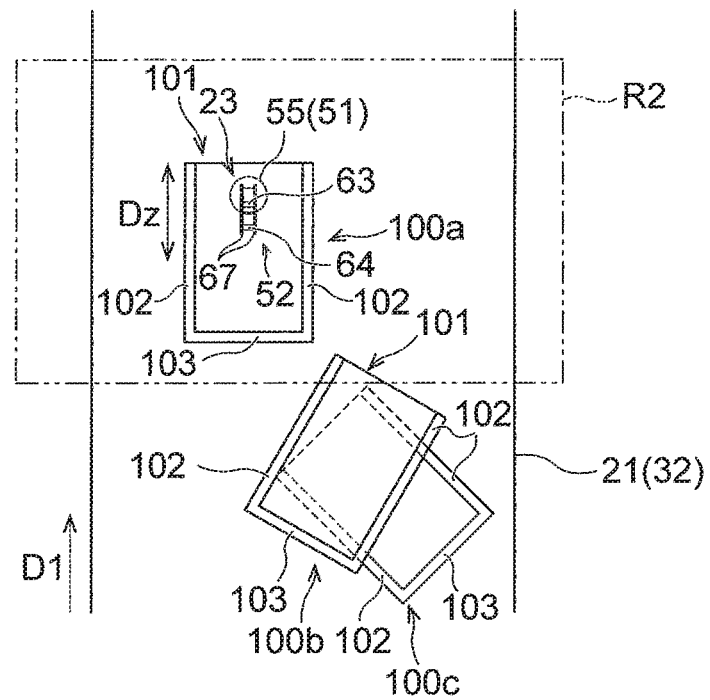
FIG. 11 is a diagram of assistance in explaining an example of a turning direction in turning operation.
Figure 12:
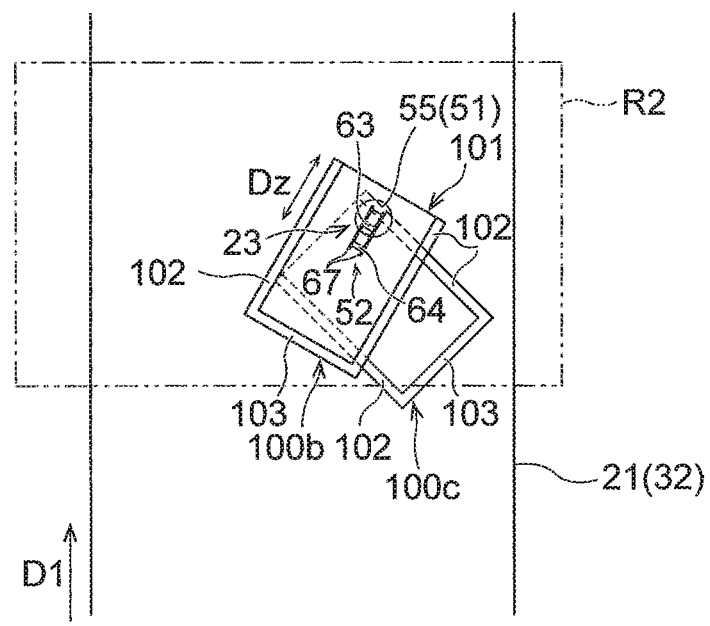
FIG. 12 is a diagram of assistance in explaining an example of the turning direction in the turning operation.

FIG. 11 and FIG. 12 are diagrams of assistance in explaining an example of a turning direction Dz in the turning operation. Incidentally, in order to facilitate understanding, FIG. 11 and in FIG. 12 show the rotary table 32 of the first conveying device 21 in a belt shape, and show a state in which the rotary table 32 linearly moves in a conveyance direction D1 together with a plurality of bag bodies 100. However, the following description is similarly applicable to the rotary table 32 shown in FIG. 1 which rotary table rotates and moves in a horizontal rotational direction D1.

As described above, the pickup control unit 93 determines the suction position of the sucking part 55 and the orientation of the holding unit 51 and the turning mechanism 52 with respect to a bag body 100 on the basis of the position suggestion data, and makes the sucking part 55 suck an upward facing surface of the target bag body 100. In the example shown in FIG. 11 and FIG. 12, a position of the target bag body 100 which position is in the vicinity of a bag mouth portion 101 in a long side direction and substantially a center in a short side direction is determined as the suction position of the sucking part 55. In addition, the orientation of the holding unit 51 and the turning mechanism 52 with respect to the bag body 100 is determined such that the tilting blocks 67 are arranged so as to extend in the long side direction of the target bag body 100 and a side of the sucking part 55 which side is lifted relatively higher in the turning operation (right side in FIGS. 7 to 10) is disposed on the bag mouth portion 101 side (that is a side far from a bottom portion 103 of the target bag body 100).

Thus, the turning direction Dz can be made to correspond to the long side direction of the target bag body 100, and when the first transfer device 23 performs the turning operation, a part of the bag body 100 which part includes the bag mouth portion 101 is lifted and an entire area of the bag mouth portion 101 can be lifted to substantially a same height. For example, as shown in FIG. 11, when the conveyance direction D1 of the first conveying device 21 and the long side direction of a target bag body 100a are substantially the same, the first transfer device 23 adjusts the orientation of the tilting blocks 67 and the sucking part 55 such that the extending direction of the tilting blocks 67 is substantially the same as the conveyance direction D1. On the other hand, as shown in FIG. 12, when the long side direction of a target bag body 100b does not coincide with the conveyance direction D1 of the first conveying device 21 but is inclined with respect to the conveyance direction D1, the first transfer device 23 adjusts the orientation of the tilting blocks 67 and the sucking part 55 such that the extending direction of the tilting blocks 67 becomes substantially the same as the long side direction of the target bag body 100b. Incidentally, while the bag body 100b and a bag body 100c are loaded on the rotary table 32 in a state of being superposed on each other in the example shown in FIG. 12, the pickup control unit 93 detects the position and orientation of the bag body 100b located at a highest position by analyzing the photographed image data from the imaging device 25, and the holding unit 51 is controlled by the pickup control unit 93 so as to hold the bag body 100b located at the highest position.

Incidentally, a concrete method of adjusting the orientation of the turning mechanism 52 and the holding unit 51 is not particularly limited. In the first transfer device 23 shown in FIG. 3, the orientation of the turning mechanism 52 and the holding unit 51 coupled to the second transfer coupling portion 77 via the first transfer coupling portion 76 and the guiding shafts 71 can be changed by axial rotation of the second transfer coupling portion 77 by the three-dimensional transfer mechanism 78 under control of the pickup control unit 93. The turning direction Dz is not particularly limited either, and the turning direction Dz may be determined such that a part other than the bag mouth portion 101 of the target bag body 100 (for example a sealed portion 102 provided in a side edge portion of the target bag body 100 or the bottom portion 103) is lifted. In this case, the three-dimensional transfer mechanism 78 adjusts the orientation of the turning mechanism 52 and the holding unit 51 by rotating the second transfer coupling portion 77 such that the extending direction of the tilting blocks 67 in the horizontal direction coincides with the turning direction Dz.

Thus, the pickup device 5 according to the present embodiment can pick up the target bag body 100 from the first conveying device 21 appropriately even when the plurality of bag bodies 100 on the first conveying device 21 (on the rotary table 32 in the present embodiment) are randomly oriented, and regardless of whether the bag bodies 100 are superposed on each other or not superposed on each other. In particular, the pickup control unit 93 can adjust the orientation of the first transfer device 23 (the turning mechanism 52 and the holding unit 51 in particular) according to the position and orientation of the target bag body 100 in the pickup region R2, the position and orientation being indicated by the position suggestion data, and therefore make the relative turning direction Dz with respect to each of the plurality of bag bodies 100 on the first conveying device 21 (that is, the rotary table 32) substantially the same between the plurality of bag bodies 100. Consequently, the transfer of the bag bodies 100 by the first conveying device 21 can be stabilized, and each of the bag bodies 100 can be placed on the mounting surface 36 of the relay support unit 26 with high accuracy.

Incidentally, "cases where the turning direction Dz is substantially the same between the plurality of bag bodies 100" include not only cases where the relative turning direction Dz with respect to each of the bag bodies 100 completely coincides between the plurality of bag bodies 100 but also cases where there are slight differences in the turning direction Dz between the plurality of bag bodies 100. That is, cases where at least a part of the portion of the bag body 100 which portion is lifted by the turning operation is common between the plurality of bag bodies 100 can correspond to the "cases where the turning direction Dz is substantially the same between the plurality of bag bodies 100." In the above-described turning operation, for example, a part of the bag body 100 which part includes the bag mouth portion 101 is lifted, and even when there are slight differences in the turning direction Dz between the plurality of bag bodies 100 due to actuation errors or the like, at least a part of the bag mouth portion 101 is lifted by the turning operation so as to be common between the plurality of bag bodies 100. Such a case therefore corresponds to the "cases where the turning direction Dz is substantially the same between the plurality of bag bodies 100." In practice, cases where variations in the turning direction Dz with respect to each of the bag bodies 100 between the plurality of bag bodies 100 are for example in a range of about 0° to 30°, preferably in a range of about 0° to 20°, more preferably in a range of about 0° to 10° can correspond to the "cases where the turning direction Dz is substantially the same between the plurality of bag bodies 100."

As described above, according to the pickup device 5 and the pickup method in accordance with the present embodiment, the first transfer device 23 is controlled by the pickup control unit 93 and moved according to the position suggestion data, liftably holds the target bag body 100 being conveyed, and can perform the turning operation and the lifting operation appropriately. It is therefore possible to lift the target bag body among the plurality of bag bodies 100 being conveyed in a state of being superposed on each other while preventing another bag body 100 from being lifted together, and appropriately place the target bag body on the mounting surface 36 of the relay support unit 26 provided in a subsequent stage.

In addition, because the position suggestion data is data indicating not only the position of the target bag body 100 but also the orientation of the target bag body 100, a holding position at which the target bag body 100 is held by the first transfer device 23 can be set appropriately, and the turning direction in the turning operation can be set to be an appropriate direction. Thus, the turning operation can be performed accurately and stably. In particular, the adjustment of the orientation of the turning mechanism 52 and the holding unit 51 according to the position suggestion data can make the relative turning direction with respect to each of the bag bodies 100 coincide between the bag bodies 100 even when the orientation of each of the bag bodies 100 on the first conveying device 21 (that is, the rotary table 32) varies. The turning operation and the lifting operation can therefore be performed consecutively and stably.

In addition, the lifting mechanism 53 that moves the holding unit 51 and the turning mechanism 52 in the vertical direction is configured in combination with the guiding shafts 71, the stopper block 74, and the compression springs 73, and thereby the sucking part 55 can be precisely adhered to the target bag body 100. In addition, there is no need for a sensor for detecting the height direction position of the target bag body 100 on the rotary table 32, so that the lifting mechanism 53 can be formed at low cost and the manufacturing cost of the processing system 10 can be reduced.

The use of the compressible compression springs 73, in particular, can ease a shock that can occur when the holding unit 51 (that is, the sucking part 55) is brought into contact with and pressed against the target bag body 100. In addition, even when the number of bag bodies 100 superposed on each other varies, and the height direction position of the target bag body 100 on the first conveying device 21 (that is, the rotary table 32) (that is, the height direction position at which the holding unit 51 holds the target bag body 100) is not fixed, the target bag body 100 can be held by the holding unit 51 appropriately while a shock acting on the first transfer device 23 is absorbed by the compression springs 73 because the holding unit 51 is pressed against the target bag body 100 such that the compression springs 73 are compressed.

In addition, the state of the position and orientation of the target bag body 100 can be detected simply and accurately by obtaining the position suggestion data on the basis of the photographed image data of the plurality of bag bodies 100.

In addition, a position at which the worker H refills bag bodies 100 (see the refilling position P1 in FIG. 1) and a position at which bag bodies 100 are supplied to the bag processing device 12 (see the handing-over position P3 in FIG. 1) can be separated from each other. Hence, by partitioning the refilling position P1 and the handing-over position P3 from each other by a wall, for example, it is possible to prevent humans such as the worker H and the like from entering the handing-over position P3, and effectively prevent contamination of the handing-over position P3 (that is, the vicinities of the magazine 14 and the bag processing device 12). Thus, the work of refilling bag bodies 100 or the work of supplying bag bodies 100 can be performed hygienically without the presence of humans at the position where the magazine 14 is installed or the position where bag bodies 100 are supplied to the bag processing device 12.

Second Embodiment

In the present embodiment, elements identical or similar to those of the foregoing first embodiment are identified by the same reference numerals, and detailed description thereof will be omitted.

Figure 13:
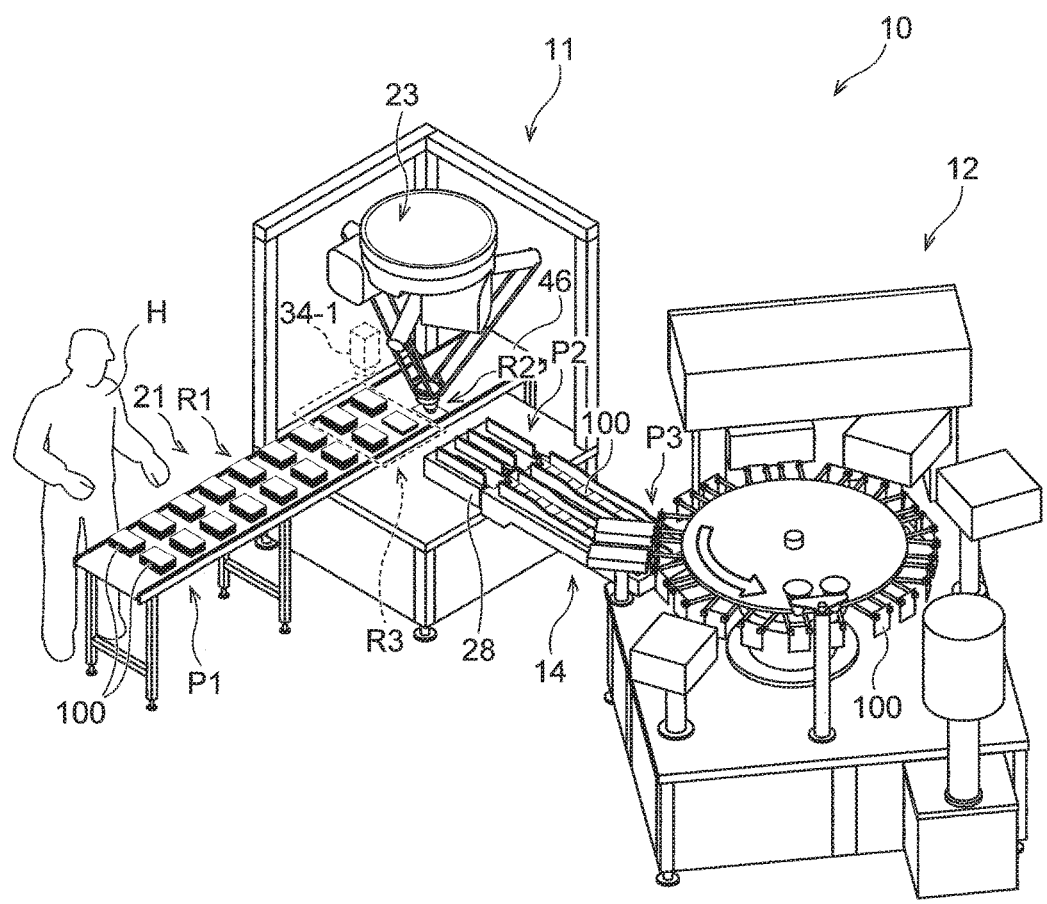
FIG. 13 is a perspective view showing an external appearance of a processing system according to a second embodiment.

FIG. 13 is a perspective view showing an external appearance of a processing system 10 according to the second embodiment.

The processing system 10 according to the present embodiment includes: a first conveying device 21 that conveys bag bodies 100; a first transfer device 23 that carries each of the bag bodies 100 from the first conveying device 21 to a set position P2; a second transfer device 28 disposed at the set position P2; and a magazine 14 that stores bag bodies 100 sent from the second transfer device 28.

The first conveying device 21 conveys a plurality of bag bodies 100 in one direction extending linearly in at least a part (the whole in FIG. 13) of a conveyance area R1. The first conveying device 21 shown in FIG. 13 has a single endless first conveying belt 46 having a web shape, and the first conveying belt 46 runs in a horizontal direction toward the second transfer device 28. A worker H refills the first conveying device 21 with bag bodies 100 by placing the plurality of bag bodies 100 adjusted in position and orientation onto the first conveying belt 46. In addition, the worker H preferably places the plurality of bag bodies 100 adjusted in orientation of top surfaces/undersurfaces thereof onto the first conveying belt 46.

A concrete mode of arrangement of the bag bodies 100 on the first conveying belt 46 is not particularly limited, and the bag bodies 100 on the first conveying belt 46 are arranged so as to be picked up and held by the first transfer device 23 appropriately. As an example, indications indicating arrangement positions of the bag bodies 100 may be formed on the surface of the first conveying belt 46, and in this case, the worker H can arrange the bag bodies 100 in appropriate positions and orientations on the first conveying belt 46 while checking the indications. In FIG. 13, a bag body integrated group is formed by a plurality of bag bodies 100, and a plurality of (specifically two) bag body integrated groups are arranged on the first conveying belt 46 in a direction perpendicular to a direction of conveyance of the bag bodies 100 by the first conveying device 21. Bag body integrated groups are arranged at fixed intervals in the direction of conveyance of the bag bodies 100 by the first conveying device 21. Incidentally, the number of bag bodies 100 constituting each bag body integrated group is preferably determined in advance, and the worker H preferably creates each bag body integrated group by stacking a predetermined number of bag bodies 100 at one position on the first conveying belt 46.

The first conveying device 21 according to the present embodiment conveys the bag bodies 100 arranged as described above in a horizontal direction intermittently. However, the first conveying device 21 may convey the bag bodies 100 continuously without stopping as long as the first transfer device 23 can appropriately carry the bag bodies 100 arranged in a pickup region R2 from positions on the first conveying device 21 onto the second transfer device 28. In a case where the first conveying device 21 (that is, the first conveying belt 46) conveys the bag bodies 100 continuously at a constant speed, in particular, there is no acceleration nor deceleration at a time of the conveyance of the bag bodies 100, and a constant inertial force acts on the bag bodies 100, so that disturbances in position and orientation of the bag bodies 100 (bag body integrated groups in particular) at the time of the conveyance can be prevented effectively.

The first transfer device 23 carries the bag bodies 100 arranged in the pickup region R2 to the set position P2 set above the second transfer device 28, releases the bag bodies 100 at the set position P2, and thereby places the bag bodies 100 on the second transfer device 28. As with the first transfer device 23 according to the foregoing first embodiment, under control of a pickup control unit 93, the first transfer device 23 according to the present embodiment in particular holds a target bag body 100 among the plurality of bag bodies 100 conveyed by the first conveying device 21 in the pickup region R2, lifts a part of the target bag body 100, and thereafter lifts the whole of the target bag body 100.

The pickup control unit 93 obtains position suggestion data indicating the position of the target bag body 100 in the pickup region R2, controls and moves the first transfer device 23 on the basis of the position suggestion data, and makes the first transfer device 23 liftably hold the target bag body 100 in the pickup region R2. Incidentally, in the present embodiment, the worker H loads a plurality of bag bodies 100 onto the first conveying belt 46 of the first conveying device 21 in a state in which the orientation of each of the bag bodies 100 is adjusted, and therefore position suggestion data indicating the orientation of the pickup target bag body 100 in the pickup region R2 is not necessary.

Hence, a bag conveying mechanism 11 shown in FIG. 13 is not provided with the imaging device 25 in the first embodiment. The first transfer device 23 therefore carries the bag bodies 100 in such a manner as to be operatively associated with the conveyance of the bag bodies 100 by the first conveying device 21 (that is, the running of the first conveying belt 46). Specifically, the first conveying device 21 stops and arranges, in the pickup region R2 defined fixedly, first bag body integrated groups on the first conveying belt 46. The first transfer device 23 carries the bag bodies 100 one by one from the pickup region R2 to the set position P2 defined fixedly. In the example shown in FIG. 13, two first bag body integrated groups are provided, and therefore the first transfer device 23 transfers each bag body 100 to the set position P2 from each of these two bag body integrated groups arranged in the pickup region R2. Then, after all of the bag bodies 100 arranged in the pickup region R2 are carried to the set position P2 by the first transfer device 23, the first conveying device 21 intermittently conveys the bag body integrated groups on the first conveying belt 46, and stops and arranges new bag body integrated groups in the pickup region R2.

The first transfer device 23 thus reciprocates between the pickup region R2 and the set position P2 determined in advance, and therefore does not need the photographed image data obtained by the imaging device 25 in the first embodiment. However, an imaging device (not shown) similar to the imaging device 25 in the first embodiment may photograph an area including the pickup region R2. In this case, the presence or absence of bag bodies 100 in the pickup region R2 can be determined by analyzing the photographed image data. The pickup control unit 93 may transfer the bag bodies 100 from the pickup region R2 to the set position P2 by the first transfer device 23 on the basis of a result of the analysis of the photographed image data. In addition, a first conveyance driving control unit 91 may control the first conveying device 21 to arrange new bag body integrated groups in the pickup region R2 after confirming that there are no longer any bag bodies 100 in the pickup region R2 on the basis of the result of the analysis of the photographed image data. In this case, the worker H does not need to care about the number of bag bodies 100 constituting each bag body integrated group, and can create each bag body integrated group by an arbitrary number of bag bodies 100. Incidentally, the analysis of the above-described photographed image data may be performed by an imaging device not shown in the figures, may be performed by the first conveyance driving control unit 91, may be performed by the pickup control unit 93, or may be performed by another device.

In addition, the presence or absence of bag bodies 100 in the pickup region R2 may be detected by an arbitrary sensor other than the imaging device 25, and the pickup control unit 93 may control the first transfer device 23 on the basis of a result of the detection.

The second transfer device 28 transfers bag bodies 100 from the first transfer device 23 to the magazine 14.

Incidentally, whereas the processing system 10 in the foregoing first embodiment is provided with the inverting mechanism 27, the processing system 10 according to the present embodiment is not provided with the inverting mechanism 27. That is, the processing system 10 according to the present embodiment does not perform the inversion processing of interchanging the orientations of the top surface and undersurface of each bag body 100. Hence, the processing system 10 according to the present embodiment is suitable for a case where the worker H adjusts the orientations of the top surface and undersurface of each bag body 100, a case where the top surface and undersurface of each bag body 100 are identical to each other, or a case where the orientations of the top surface and undersurface of each bag body 100 do not need to be adjusted.

Figure 14:
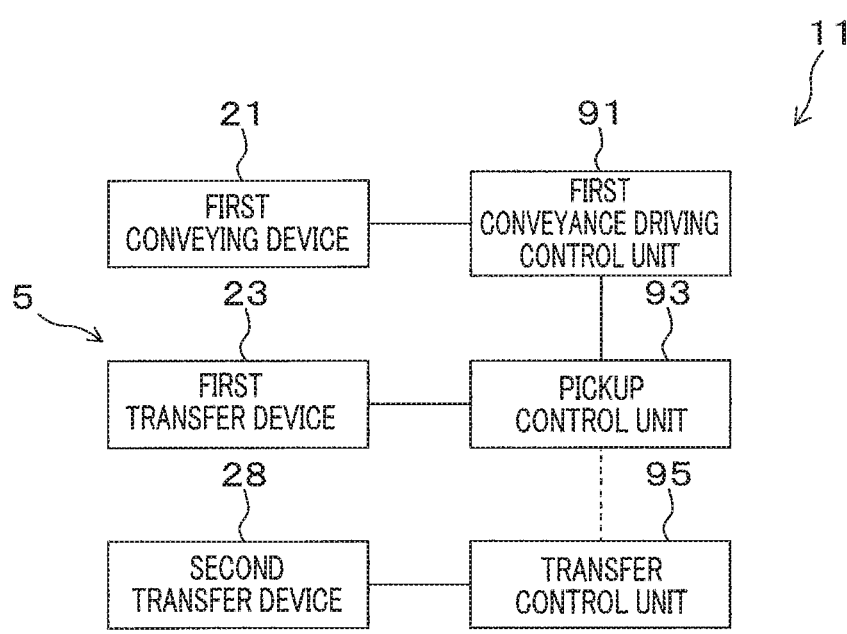
FIG. 14 is a block diagram showing control units according to the second embodiment.

FIG. 14 is a block diagram showing control units according to the second embodiment.

The bag conveying mechanism 11 includes: the first conveyance driving control unit 91 that controls the first conveying device 21; the pickup control unit 93 that controls the first transfer device 23; and a transfer control unit 95 that controls the second transfer device 28.

The pickup control unit 93 according to the present embodiment also obtains, from the first conveyance driving control unit 91, position suggestion data indicating the position of at least one or more bag bodies 100 among a plurality of bag bodies 100 in the conveyance area R1, and controls the first transfer device 23 on the basis of the position suggestion data. The position suggestion data according to the present embodiment is information about the conveyance of bag bodies 100 by the first conveying device 21, and is information about conveyance speed and intermittent conveyance timing of the first conveying belt 46. The pickup control unit 93 controls the first transfer device 23 such that all of the bag bodies 100 arranged in the pickup region R2 are carried to the set position P2 while the first conveying belt 46 is intermittently stopped.

Incidentally, the transfer control unit 95 can actuate the second transfer device 28 according to a state of actuation of the first transfer device 23 by obtaining data indicating the state of actuation of the first transfer device 23 from the pickup control unit 93.

As described above, according to a pickup device 5 and a pickup method according to the present embodiment, as in the foregoing first embodiment, the first transfer device 23 is moved according to the position suggestion data, liftably holds the target bag body 100 being conveyed, and can perform a turning operation and a lifting operation appropriately. It is therefore possible to lift the target bag body 100 among the plurality of bag bodies 100 being conveyed while preventing another bag body 100 from being lifted together, and appropriately supply the target bag body 100 to the magazine 14.

Incidentally, in the above-described example, the first conveying belt 46 is moved intermittently, and the first transfer device 23 carries all of the bag bodies 100 arranged in the pickup region R2 to the set position P2 during an intermittent stop. Therefore, in the processing system 10 shown in FIG. 13, a region corresponding to one bag body integrated group in the direction of conveyance of bag bodies 100 (that is, the traveling direction of the first conveying belt 46) is set as the pickup region R2. That is, in the pickup region R2, two bag body integrated groups are arranged on the first conveying belt 46 in a horizontal direction perpendicular to the direction of conveyance of the bag bodies 100, while one bag body integrated group is disposed on the first conveying belt 46 in the direction of conveyance of the bag bodies 100.

However, a region corresponding to two or more bag body integrated groups in the direction of conveyance of the bag bodies 100 may be set as the pickup region R2. In this case, the first transfer device 23 can transfer each bag body 100 from each of a plurality of bag body integrated groups arranged in the pickup region R2 to the set position P2. In this case, when the first conveying belt 46 is moved intermittently, the first transfer device 23 may carry all of the bag bodies 100 arranged in the pickup region R2 to the set position P2 by the first transfer device 23 under control of the pickup control unit 93 during one intermittent stop. In this case, it suffices for the first transfer device 23 to transfer the target bag bodies 100 while reciprocating between the pickup region R2 and the set position P2 determined in advance. In addition, the first transfer device 23 may not have to carry all of the bag bodies 100 arranged in the pickup region R2 to the set position P2 by the first transfer device 23 under control of the pickup control unit 93 during one intermittent stop. In this case, the first transfer device 23 may carry all of bag bodies 100 included in bag body integrated groups arranged at a head in the direction of conveyance of the bag bodies 100 (that is, in the traveling direction of the first conveying belt 46) in the pickup region R2 (which bag body integrated groups will hereinafter be referred to also as "main integrated groups"; two main integrated groups in FIG. 13) from the pickup region R2 to the set position P2 under control of the pickup control unit 93 during one intermittent stop, or may carry all of the main integrated groups from the pickup region R2 to the set position P2 during a plurality of intermittent stops. In addition, also in a case where the first conveying device 21 continuously conveys the bag bodies 100 without stopping the bag bodies 100, a region corresponding to two or more bag body integrated groups in the direction of conveyance of the bag bodies 100 may be set as the pickup region R2.

Third Embodiment

In the present embodiment, elements identical or similar to those of the foregoing first and second embodiments are identified by the same reference numerals, and detailed description thereof will be omitted.

Figure 15:
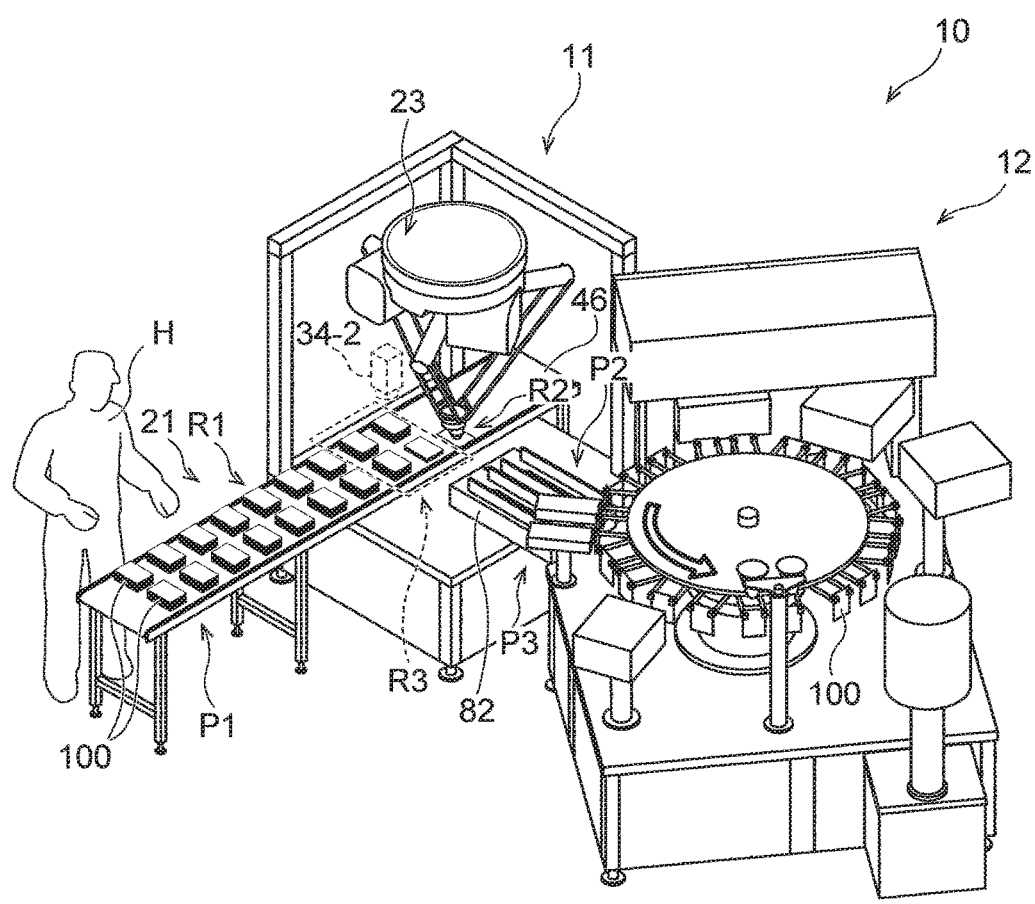
FIG. 15 is a perspective view showing an external appearance of a processing system according to a third embodiment.

FIG. 15 is a perspective view showing an external appearance of a processing system 10 according to a third embodiment.

The processing system 10 according to the present embodiment includes: a first conveying device 21 that conveys bag bodies 100; a first transfer device 23 that carries each of the bag bodies 100 from the first conveying device 21 to a set position P2; and a bag body housing tool 82 that guides the bag bodies 100 from the set position P2 to a handing-over position P3.

The first conveying device 21 is configured in a similar manner to the first conveying device 21 according to the foregoing second embodiment. Hence, the first conveying device 21 conveys bag bodies 100 (that is, bag body integrated groups) to a pickup region R2 intermittently or continuously. In a case where the first conveying device 21 (that is, a first conveying belt 46) conveys the bag bodies 100 continuously at a constant speed, in particular, there is no acceleration nor deceleration at a time of conveyance of the bag bodies 100, and a constant inertial force acts on the bag bodies 100, so that disturbances in position and orientation of the bag bodies 100 (bag body integrated groups in particular) at the time of the conveyance can be prevented effectively.

The first transfer device 23 carries a bag body 100 disposed in the pickup region R2 to the set position P2 set above the bag body housing tool 82, releases the bag body 100 at the set position P2, and thereby places the bag body 100 on the bag body housing tool 82. As with the first transfer devices 23 according to the foregoing first and second embodiments, under control of a pickup control unit 93, the first transfer device 23 according to the present embodiment in particular holds a target bag body 100 among a plurality of bag bodies 100 conveyed by the first conveying device 21 in the pickup region R2, lifts a part of the target bag body 100, and thereafter lifts the whole of the target bag body 100. Incidentally, as with the first transfer device 23 according to the second embodiment, the first transfer device 23 according to the present embodiment reciprocates between the pickup region R2 and the set position P2 determined in advance. The first transfer device 23 according to the present embodiment thus carries the target bag body 100 to the set position P2 so that the target bag body 100 is disposed at the handing-over position P3 for handing over the target bag body 100 to a bag processing device 12.

The bag body housing tool 82 disposes the bag body 100 from the first transfer device 23 at the handing-over position P3. One or a plurality of bag bodies 100 (two bag bodies 100 in FIG. 15) arranged at the handing-over position P3 are handed over to the bag processing device 12 by a handing-over device (see reference numeral "81" in FIG. 16 to be described later).

Incidentally, the set position P2 and the handing-over position P3 may coincide with each other, or may not coincide with each other. When the set position P2 and the handing-over position P3 coincide with each other, the first transfer device 23 directly carries each bag body 100 from the pickup region R2 to the handing-over position P3. When the set position P2 and the handing-over position P3 do not coincide with each other, on the other hand, the bag body housing tool 82 guides the bag bodies 100 from the set position P2 to the handing-over position P3. A method of guiding the bag bodies 100 by the bag body housing tool 82 is not particularly limited. For example, a conveyance surface of the bag body housing tool 82 may be tilted, and the bag bodies 100 may be guided from the set position P2 to the handing-over position P3 by using gravity. In addition, the bag body housing tool 82 may have a mechanism for actively conveying the bag bodies 100 from the set position P2 to the handing-over position P3.

Figure 16:
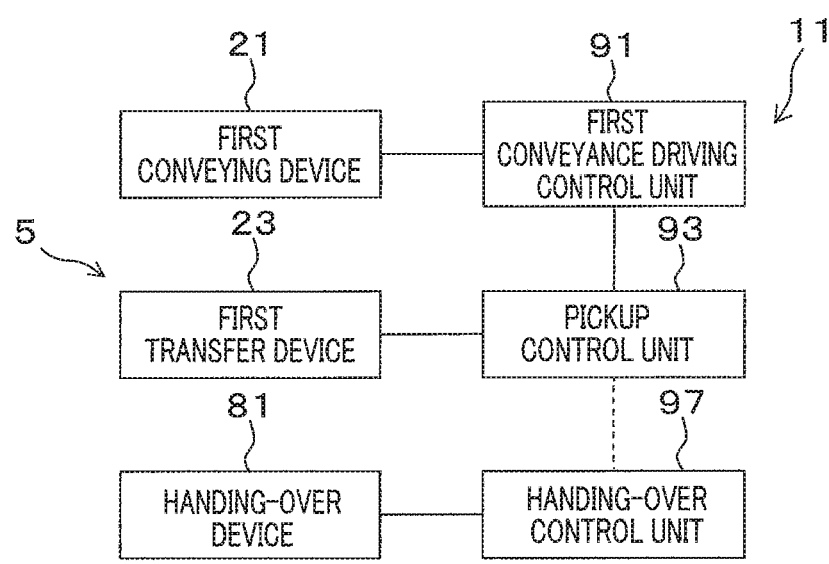
FIG. 16 is a block diagram showing control units according to the third embodiment.

FIG. 16 is a block diagram showing, control units according to the third embodiment.

A bag conveying mechanism 11 includes: a first conveyance driving control unit 91 that controls the first conveying device 21; the pickup control unit 93 that controls the first transfer device 23; and a handing-over control unit 97 that controls a handing-over device 81.

As with the pickup control unit 93 according to the foregoing second embodiment, the pickup control unit 93 according to the present embodiment obtains position suggestion data indicating the position of the target bag body 100 in the pickup region R2, controls and moves the first transfer device 23 on the basis of the position suggestion data, and makes the first transfer device 23 liftably hold the target bag body 100 in the pickup region R2. Incidentally, in the present embodiment, a plurality of bag bodies 100 are placed on the first conveying belt 46 of the first conveying device 21 in a state in which the orientation of each of the bag bodies 100 is adjusted by a worker H, and therefore position suggestion data indicating the orientation of the pickup target bag body 100 in the pickup region R2 is not necessary.

Incidentally, the handing-over control unit 97 controlling the handing-over device 81 can actuate the handing-over device 81 according to a state of actuation of the first transfer device 23 by obtaining data indicating the state of actuation of the first transfer device 23 from the pickup control unit 93.

As with the processing system 10 according to the foregoing second embodiment, the processing system 10 according to the foregoing present embodiment is suitable for a case where the worker H adjusts the orientations of the top surface and undersurface of each bag body 100, a case where the top surface and undersurface of each bag body 100 are identical to each other, or a case where the orientations of the top surface and undersurface of each bag body 100 do not need to be adjusted.

As described above, according to a pickup device 5 and a pickup method according to the present embodiment, as in the foregoing first and second embodiments, the first transfer device 23 is moved according to position suggestion data, liftably holds the target bag body 100 being conveyed, and can perform a turning operation and a lifting operation appropriately. It is therefore possible to lift the target bag body 100 among a plurality of bag bodies 100 being conveyed while preventing another bag body 100 from being lifted together, and appropriately supply the target bag body 100 to the handing-over position P3 for the bag processing device 12.

Modifications

The present invention is not limited to the foregoing embodiments and modifications.

For example, the part of the target bag body 100 which part is held by the holding unit 51 (the sucking part 55 in particular) is not particularly limited. Specifically, the position of the part held by the holding unit 51 in an outward directed surface of the target bag body 100 does not necessarily need to be a central position of the surface or a position on a central line of the surface, but may be a position separated from the central position and the central line of the surface. For example, the vicinity of the sealed portion 102 of the side edge of the target bag body 100, the vicinity of the bottom portion 103 of the target bag body 100, or the vicinity of a corner portion formed by the bag mouth portion 101 or the bottom portion 103 and the sealed portion 102 may be held by the holding unit 51. However, a region including the part of the target bag body 100 which part is separated from another bag body 100 immediately below in the turning operation is preferably held by the holding unit 51. In addition, while only a part of the outward directed surface of the target bag body 100 is sucked by the sucking part 55 in the foregoing embodiments, substantially the whole of the outward directed surface of the target bag body 100 may be held by the holding unit 51. Also in this case, in the turning process, as in the foregoing embodiments, a part of the outward directed surface of the target bag body 100 is preferably pressed by the rollers 68.

In addition, while the first transfer device 23 has only one holding unit 51 (that is, one sucking part 55) in the foregoing embodiments, the first transfer device 23 may have a plurality of holding units 51 (that is, a plurality of sucking parts 55). In addition, while the holding unit 51 and the turning mechanism 52 are rotated by rotating the second transfer coupling portion 77 of the three-dimensional transfer mechanism 78 constituting the first transfer device 23 in the foregoing embodiments, the holding unit 51 and the turning mechanism 52 may be rotated on the basis of another rotating mechanism.

In addition, while description has been made of a case where the superposition direction of the bag bodies 100 is the vertical direction in the foregoing embodiments, the superposition direction of the bag bodies 100 may be a direction other than the vertical direction. Also in a case where a plurality of bag bodies 100 in a sheet shape are conveyed in a state of being superposed on each other in the horizontal direction while each of the bag bodies 100 is erected, for example, it is possible to pick up only a target bag body 100 while preventing another bag body 100 from being lifted together by performing the turning operation and the lifting operation described above on the basis of the position suggestion data.

In addition, while the processing of inverting bag bodies 100 is not performed in the second embodiment and the third embodiment described above, a device for performing the processing of inverting bag bodies 100 may be provided. As an example, the processing of inverting bag bodies 100 may be performed by providing an imaging device 25, a mounting surface 36, an inverting mechanism 27, and an inversion control unit 94 similar to those of the foregoing first embodiment. In that case, the imaging device 25 obtains the photographed image data of each bag body 100 on the mounting surface 36, in the pickup region R2, or on an upstream side of the pickup region R2. The inversion control unit 94 determines the necessity of interchanging the orientation of the top surface of a bag body 100 disposed on the mounting surface 36 and the orientation of the undersurface of the bag body 100 on the basis of the photographed image data (that is, information indicating the orientation of the bag body 100), and interchanges the orientation of the top surface of the bag body 100 and the orientation of the undersurface of the bag body 100 by the inverting mechanism 27 only when it is determined that the interchange is necessary.

In addition, the second embodiment and the third embodiment described above may also be provided with a bag detecting unit that obtains information indicating the positions and orientations of a plurality of bag bodies 100 in the conveyance area R1, such as the imaging device 25 according to the first embodiment or the like (see reference numeral "34-1" in FIG. 13 and reference numeral "34-2" in FIG. 15). In this case, the pickup control unit 93 can control the first transfer device 23 on the basis of position suggestion data based on information obtained by the bag detecting unit 34-1 or 34-2 in addition to the position suggestion data obtained from the first conveyance driving control unit 91. Incidentally, the installation position of such a bag detecting unit 34-1 or 34-2 is not particularly limited as long as the bag detecting unit 34-1 or 34-2 is installed at such a position as to be able to obtain information indicating the positions and orientations of the bag bodies 100 (that is, bag body integrated groups) loaded on the first conveying belt 46. However, it is preferable from a viewpoint of accurately detecting the positions and orientations of the bag bodies 100 (that is, the bag body integrated groups) in the pickup region R2 that the bag detecting unit 34-1 or 34-2 obtain information indicating the positions and orientations of the plurality of bag bodies 100 at a position close to the pickup region R2. Specifically, it is preferable that the bag detecting unit 34-1 or 34-2 be disposed at such a position as to be able to photograph the bag bodies 100 in the pickup region R2 or bag bodies 100 in an adjacent region on an upstream side of the pickup region R2 (see reference character "R3" in FIG. 13 and FIG. 15) and obtain information indicating the positions and orientations of the bag bodies 100. Incidentally, the bag detecting units 34-1 and 34-2 shown in FIG. 13 and FIG. 15 are supported by a stay not shown in the figures.

In addition, while the imaging device 25 is used as the bag detecting unit 34 and the orientation information obtaining unit 35 (see FIG. 2) in the foregoing embodiments and modifications, each of the bag detecting unit 34 and the orientation information obtaining unit 35 may be formed by a device such as a sensor or the like other than the imaging device. For example, a method other than the analysis of the photographed image data of the bag bodies 100 on the rotary table 32 may obtain information indicating the positions and orientations of a plurality of bag bodies 100 on the first conveying device 21 (on the rotary table 32 in FIG. 1), and may obtain information indicating the orientations of the top surfaces and undersurfaces of the bag bodies 100 arranged on the mounting surface 36.

In addition, the bag conveying mechanism 11 may be provided with a sensor or an imaging device other than the foregoing as required. For example, a sensor or an imaging device for detecting the presence or absence of bag bodies 100 on the mounting surface 36 (see FIG. 1) may be provided in the foregoing first embodiment. In this case, the inversion control unit 94 may control the inverting mechanism 27 on the basis of a result of the detection. In addition, a sensor or an imaging device for detecting the presence or absence of bag bodies 100 at the set position P2 may be provided in the foregoing second embodiment. In this case, the transfer control unit 95 may control the second transfer device 28 on the basis of a result of the detection. In addition, a sensor or an imaging device for detecting the presence or absence of bag bodies 100 at the handing-over position P3 may be provided in each of the foregoing embodiments. In this case, the handing-over control unit (see reference numeral "97" in FIG. 16) may control the handing-over device (see reference numeral "68" in FIG. 16) on the basis of a result of the detection.

Incidentally, an object housed in the bag bodies 100 may be a single kind of object, or may be a plurality of kinds of objects. In addition, the object housed in the bag bodies 100 may have an arbitrary form, and for example an object having the form of a powder, a liquid, a gel, a solid, a gas, or two or more thereof may be housed in the bag bodies 100. In addition, while uses of the object housed in the bag bodies 100 are not particularly limited, an object typically used in a field of food, medicine, cosmetics, or agricultural chemicals can be housed in the bag bodies 100.

In addition, while the pickup device 5 and the pickup method according to the present invention are applied to the bag conveying mechanism 11 and the bag processing device 12 in the foregoing embodiments, the present invention is applicable to other systems, devices, and methods.

The present invention is not limited to the foregoing embodiments and modifications. For example, various modifications may be made to the elements of the foregoing embodiments and modifications. In addition, modes including constituent elements and/or methods other than the constituent elements and/or methods described above can be included in embodiments of the present invention. In addition, modes not including elements as a part of the constituent elements and/or methods described above can be included in embodiments of the present invention. In addition, modes including a part of the constituent elements and/or methods included in a certain embodiment of the present invention and a part of the constituent elements and/or methods included in another embodiment of the present invention can be included in embodiments of the present invention. Hence, constituent elements and/or methods included in each of the embodiments and modifications described above and embodiments of the present invention other than the foregoing may be combined with each other, and modes according to such combinations can be included in embodiments of the present invention. In addition, effects produced by the present invention are not limited, to the above-described effects, but a specific effect corresponding to a concrete configuration of each embodiment can be exerted. Thus, various additions, changes, and partial deletions can be made to elements described in the claims, the specification, the abstract, and the drawings without departing from the technical ideas and spirit of the present invention.

The invention claimed is:

1. A pickup method comprising the steps of:
    holding a target bag body among a plurality of bag bodies by a transfer device while the plurality of bag bodies are conveyed; and
    lifting a whole of the target bag body after lifting a part of the target bag body,
    wherein the target bag body extends in a long side direction and a short side direction, and wherein the target bag body has a bag mouth portion on one side in the long side direction, and
    wherein the transfer device is moved according to position suggestion data indicating a position of the target bag body, and liftably holds a hold position of the target bag body, the hold position being in a vicinity of the bag mouth portion in the long side direction and being substantially a center of the target bag body in the short side direction.

2. The pickup method according to claim 1, wherein the transfer device is configured to adjust a turning direction, which is a direction of lifting the part of the target bag body, to correspond to the long side direction of the target bag body, and
    wherein, when the transfer device performs the turning operation, a part of the target bag body which part includes the bag mouth portion of the target bag body is lifted and an entire area of the bag mouth portion of the target bag body is configured to be lifted to substantially a same height.

3. A pickup method comprising the steps of:
    holding a target bag body among a plurality of bag bodies by a transfer device while the plurality of bag bodies are conveyed; and
    lifting a whole of the target bag body after lifting a part of the target bag body,
    wherein the transfer device is moved according to position suggestion data indicating a position of the target bag body, and liftably holds the target bag body,
    wherein the position suggestion data indicating an orientation of the target bag body in addition to the position of the target bag body is obtained by a pickup control unit, and
    wherein the transfer device adjusts a turning direction which is a direction of lifting the part of the target bag body, according to the position suggestion data under control of the pickup control unit.

4. The pickup method according to claim 3, wherein the transfer device includes:
    a holding unit that liftably holds each of the plurality of bag bodies;
    a turning mechanism that makes the holding unit perform a turning operation of lifting the part of the target bag body; and
    a lifting mechanism that makes the holding unit perform a lifting operation of lifting the whole of the target bag body, and
    wherein the turning mechanism is adjusted according to the position suggestion data under control of the pickup control unit in such a manner that the turning direction relative to each of the plurality of bag bodies is substantially identical between the plurality of bag bodies.

5. A pickup device comprising:
    a transfer device that holds a target bag body among a plurality of bag bodies by a conveying device while the plurality of bag bodies are conveyed, and lifts a whole of the target bag body after lifting a part of the target bag body; and a pickup control unit that obtains position suggestion data indicating a position of the target bag body, and controls the transfer device on a basis of the position suggestion data, wherein the pickup control unit moves the transfer device according to the position suggestion data, and makes the transfer device liftably hold the target bag body, wherein the pickup control unit obtains the position suggestion data indicating an orientation of the target bag body in addition to the position of the target bag body, and wherein the pickup control unit controls the transfer device according to the orientation of the target bag body indicated by the position suggestion data in such a manner that a turning direction which is a direction in which the transfer device lifts the part of the target bag body is adjusted.

6. The pickup device according to claim 5, wherein the transfer device includes:

a holding unit that liftably holds each of the plurality of bag bodies;

a turning mechanism that makes the holding unit perform a turning operation of lifting the part of the target bag body; and a lifting mechanism that makes the holding unit perform a lifting operation of lifting the whole of the target bag body, wherein the pickup control unit adjusts the turning mechanism according to the position suggestion data in such a manner that the turning direction relative to each of the plurality of bag bodies is substantially identical between the plurality of bag bodies.

7. The pickup device according to claim 6, wherein the pickup control unit obtains the position suggestion data on a basis of photographed image data of the plurality of bag bodies, the photographed image data being obtained by an imaging device.

8. The pickup device according to claim 6, wherein the lifting mechanism has a parallel link robot.

9. The pickup device according to claim 8, wherein the pickup control unit obtains the position suggestion data on a basis of photographed image data of the plurality of bag bodies, the photographed image data being obtained by an imaging device.

10. The pickup device according to claim 5, wherein the transfer device includes:

a holding unit that liftably holds each of the plurality of bag bodies;

a turning mechanism that makes the holding unit perform a turning operation of lifting the part of the target bag body; and a lifting mechanism that makes the holding unit perform a lifting operation of lifting the whole of the target bag body, and wherein the lifting mechanism includes:

a guiding shaft;

a moving body that is fixedly attached to the turning mechanism and slidably attached to the guiding shaft, and moves together with the turning mechanism along the guiding shaft, and an elastic part that biases the moving body toward one end portion of the guiding shaft.

11. The pickup device according to claim 10, wherein the lifting mechanism has a parallel link robot.

12. The pickup device according to claim 10, wherein the pickup control unit obtains the position suggestion data on a basis of photographed image data of the plurality of bag bodies, the photographed image data being obtained by an imaging device.

13. The pickup device according to claim 11, wherein the pickup control unit obtains the position suggestion data on a basis of photographed image data of the plurality of bag bodies, the photographed image data being obtained by an imaging device.

14. The pickup device according to claim 5, wherein the pickup control unit obtains the position suggestion data on a basis of photographed image data of the plurality of bag bodies, the photographed image data being obtained by an imaging device.

15. A pickup device comprising:

a transfer device that holds a target bag body among a plurality of bag bodies by a conveying device while the plurality of bag bodies are conveyed, and lifts a whole of the target bag body after lifting a part of the target bag body; and a pickup control unit that obtains position suggestion data indicating a position of the target bag body, and controls the transfer device on a basis of the position suggestion data, wherein the target bag body extends in a long side direction and a short side direction, and wherein the target bag body has a bag mouth portion on one side in the long side direction, and wherein the pickup control unit moves the transfer device according to the position suggestion data, and makes the transfer device liftably hold a hold position of the target bag body, the hold position being in a vicinity of the bag mouth portion in the long side direction and being substantially a center of the target bag body in the short side direction.

16. The pickup device according to claim 15, wherein the transfer device includes:

a holding unit that liftably holds each of the plurality of bag bodies;

a turning mechanism that makes the holding unit perform a turning operation of lifting the part of the target bag body; and a lifting mechanism that makes the holding unit perform a lifting operation of lifting the whole of the target bag body, wherein the lifting mechanism includes:

a guiding shaft;

a moving body that is fixedly attached to the turning mechanism and slidably attached to the guiding shaft, and moves together with the turning mechanism along the guiding shaft, and an elastic part that biases the moving body toward one end portion of the guiding shaft.

17. The pickup device according to claim 16, wherein the lifting mechanism has a parallel link robot.

18. The pickup device according to claim 17, wherein the pickup control unit obtains the position suggestion data on a basis of photographed image data of the plurality of bag bodies, the photographed image data being obtained by an imaging device.

19. The pickup device according to claim 16, wherein the pickup control unit obtains the position suggestion data on a basis of photographed image data of the plurality of bag bodies, the photographed image data being obtained by an imaging device.

20. The pickup device according to claim 15, wherein the transfer device is configured to adjust a turning direction, which is a direction of lifting the part of the target bag body, to correspond to the long side direction of the target bag body, and wherein, when the transfer device performs the turning operation, a part of the target bag body which part includes the bag mouth portion of the target bag body is lifted and an entire area of the bag mouth portion of the target bag body is configured to be lifted to substantially a same height.

21. The pickup device according to claim 15, wherein the pickup control unit obtains the position suggestion data on a basis of photographed image data of the plurality of bag bodies, the photographed image data being obtained by an imaging device.

* * * * *